United States Patent
Yamaguchi et al.

(10) Patent No.: US 6,654,672 B2
(45) Date of Patent: Nov. 25, 2003

(54) CONTROL APPARATUS AND CONTROL METHOD FOR HYBRID VEHICLE

(75) Inventors: Kozo Yamaguchi, Anjo (JP); Kenji Gotou, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/282,188

(22) Filed: Oct. 29, 2002

(65) Prior Publication Data

US 2003/0060948 A1 Mar. 27, 2003

Related U.S. Application Data

(62) Division of application No. 09/862,506, filed on May 23, 2001, now Pat. No. 6,546,319.

(30) Foreign Application Priority Data

May 25, 2000 (JP) ......................................... 2000-154864

(51) Int. Cl.[7] ................................................. B60K 9/00
(52) U.S. Cl. ............................ 701/22; 180/65.3; 475/5; 240/40 C
(58) Field of Search ............................... 701/22, 1, 36; 180/65.3; 475/5, 2; 290/40 C

(56) References Cited

U.S. PATENT DOCUMENTS

| | | | |
|---|---|---|---|
| 5,558,589 A | * 9/1996 | Schmidt | 475/5 |
| 5,635,805 A | * 6/1997 | Ibaraki et al. | 318/139 |
| 5,788,006 A | 8/1998 | Yamaguchi | |
| 5,899,286 A | * 5/1999 | Yamaguchi | 180/65.3 |
| 5,931,757 A | * 8/1999 | Schmidt | 475/2 |
| 6,087,734 A | * 7/2000 | Maeda et al. | 290/40 C |
| 6,247,437 B1 | * 6/2001 | Yamaguchi et al. | 123/179.3 |
| 6,253,127 B1 | * 3/2002 | Itoyama et al. | 701/22 |

* cited by examiner

Primary Examiner—William A. Cuchlinski, Jr.
Assistant Examiner—Olga Hernandez
(74) Attorney, Agent, or Firm—Oliff & Berridge, PLC

(57) ABSTRACT

A control apparatus for a vehicle includes an engine, first and second electric motors, an output shaft connected to a drive wheel 41, a differential gear device, the gear elements of which are connected to the engine, the first and second electric motors, and the output shaft, respectively, target output torque setting means for setting target output torque, control torque calculating means for setting a target output torque, and torque control means for controlling a torque in accordance with the control torque. The control torque calculating means includes engine non-rotational state forming means for bringing the engine into a non-rotational state. Since the electric motor torque can be controlled independently, the target output torque can easily be generated, allowing easy generation of a target output torque in the state where the engine is stopped as well as preventing the output torque loss.

9 Claims, 23 Drawing Sheets

CONTROL APPARATUS AND CONTROL METHOD FOR HYBRID VEHICLE

This is a Division of application Ser. No. 09/862,506 filed May 23, 2001, now U.S. Pat. No. 6,546,319. The entire disclosure of the prior application is hereby incorporated by reference herein in its entirety.

BACKGROUND OF THE INVENTION

1. Field of Invention

The invention relates to a control apparatus and a control method for a hybrid type vehicle.

2. Description of Related Art

A split type hybrid vehicle has been conventionally provided in which an engine, two electric motors, and a planetary gear unit as a differential gear device are provided, and three gear elements of the planetary gear unit are connected to the engine, one of the electric motors and an output shaft, respectively, and the other electric motor and the output shaft are connected.

When the hybrid vehicle is allowed to run in the state where the engine is stopped, one electric motor is mainly driven, a shortage of the electric motor torque generated thereby with respect to the target output torque is compensated by driving the other electric motor. The torque generated by the other electric motor is transmitted to the output shaft through the planetary gear unit (see Japanese Patent Laid-Open Publication No. HEI 8-295140).

However, in the aforementioned conventional hybrid vehicle, more specifically, the split type hybrid vehicle in which the planetary gear unit has four gear elements, each of which is connected to the engine, two electric motors, and the output shaft, respectively, those two electric motors are connected to the gear elements and not connected to the output shaft. The shortage of the electric motor torque generated by one electric motor with respect to the target output torque cannot be compensated by driving the other electric motor. Accordingly it is difficult to generate the target output torque.

That is, in this type of hybrid vehicle, the engine torque generated by the engine, electric motor torque generated by each electric motor, and output torque delivered to the output shaft act with each other via the planetary gear unit, by which each torque can be balanced. Accordingly the electric motor torque generated by each electric motor cannot be independently controlled, and the shortage of the electric motor torque generated by one electric motor with respect to the target output torque cannot be compensated by driving the other electric motor.

Meanwhile, when the engine is operated from the stopped state accompanied with driving of each electric motor, an output torque loss may occur.

SUMMARY OF THE INVENTION

In view of the foregoing problems of the conventional hybrid vehicle, it is an object of the invention to provide a control apparatus and a control method of a split-type hybrid vehicle in which a differential gear unit includes four gear elements, each of which is connected to the engine, two electric motors, and the output shaft such that the target output torque can be easily generated in the engine stop state, and the output torque loss can be prevented.

A control apparatus of a hybrid vehicle includes an engine; first and second motors; an output shaft connected to a driving wheel; a differential gear unit including at least four gear elements, each of which is connected to the engine, the first and second motors and the output shaft; target output torque setting means for setting a target output torque corresponding to an output torque output to the output shaft; control torque calculating means for calculating a control torque as a target for electrically controlling the first and second motors based on the target output torque; and torque control means for controlling torque of the first and second motors in accordance with the control torque.

The control torque calculating means is provided with engine non-rotational state forming means for bringing the engine into a non-rotational state while keeping the engine stopped.

In this case, the target output torque is set, control torque as a target for electrically controlling the first and second electric motors is calculated, and the first and second motor torque controls are performed. The engine is brought into the non-rotational state at the stopped state of the engine.

Therefore, torque of the first and second electric motors can independently be controlled and thus, the target output torque can easily be generated.

Further, since the engine is brought into the non-rotational state, the stopped engine is not rotated even when the first and second electric motors are driven. Therefore, it is possible to prevent the loss of output torque.

In a control apparatus of a hybrid vehicle, the engine non-rotational state forming means sets the torque acting on an output member of the engine at zero.

In a control apparatus of a hybrid vehicle, the engine non-rotational state forming means generates torque for biasing an output member of the engine into a forward rotational direction, which is set smaller than a sliding motion starting resistance torque of the engine.

In this case, the torque is generated, and the output member of the engine is energized in the forward revolution direction. Therefore, if an error occurs in the control of the electric motor torque and the torque for rotating the engine in the forward or reverse direction, the engine may rotate in the forward direction but not rotate in the reverse direction. Thus, the function of the engine is not affected.

A control apparatus of a hybrid vehicle includes an engine; first and second motors, an output shaft connected to a driving wheel, and a differential gear unit including at least four gear elements, each of which is connected to the engine, the first and second motors and the output shaft; target output torque setting means for setting a target output torque corresponding to an output torque output to the output shaft; applying torque setting means for setting a torque acting on an output member of the engine; control torque calculating means for calculating a control torque as a target for electrically controlling the first and second motors based on the target output torque and the torque acting on the output member of the engine; and torque control means for controlling torque of the first and second motors in accordance with the control torque.

In a control apparatus of a hybrid vehicle, the applying torque setting means sets the torque acting on the output member of the engine at zero.

In a control apparatus of a hybrid vehicle, the applying torque setting means generates a torque for biasing an output member of the engine into a forward rotational direction, which is set smaller than a sliding motion starting resistance torque of the engine.

In a control apparatus of a hybrid vehicle, the control torque is represented by target motor torque $TM1^*$, $TM2^*$, and when it is assumed that the target output torque is TO*, the target motor torque TM1*, TM2* are expressed by the following equations:

$$TM1^* = K1 \cdot TO^*; \text{ and } TM2^* = K2 \cdot TO^*,$$

where K1 and K2 are constants.

In a control apparatus of a hybrid vehicle, the control torque is represented by target motor torque TM1*, TM2*, and when it is assumed that the target output torque is TO* and the torque acting on the output member of the engine is TE, the target motor torque TM1*, TM2* are expressed by the following equations:

$$TM1^* = K1 \cdot TO^* + K3 \cdot TE; \text{ and } TM2^* = K2 \cdot TO^* + K4 \cdot TE,$$

where K1 to K4 are constants.

A control apparatus of a hybrid vehicle includes an engine, first and second motors, an output shaft connected to a driving wheel, a differential gear unit including at least four gear elements, each of which is connected to the engine, the first and second motors and the output shaft; a one-way clutch disposed between an output member and a fixing member of the engine for preventing the engine from rotating in a reverse direction and for allowing the engine to rotate in the forward direction; target output torque setting means for setting a target output torque corresponding to the output torque delivered to the output shaft; control torque calculating means for calculating a control torque as a target for electrically controlling the first and second motors based on the target output torque; and torque control means for controlling torque of the first and second motors in accordance with the control torque.

The control torque calculating means is provided with engine non-rotational state forming means for bringing the engine into a non-rotational state while keeping the engine stopped, and for generating a predetermined one-way clutch torque caused to act on the one-way clutch.

In this case, the one-way clutch torque is generated, and the output member of the engine is energized in the forward rotation direction. Therefore, if an error occurs in the control of the motor torque and the torque for rotating the engine in the forward or reverse direction is generated, the engine may rotate in the forward direction, but may not rotate in the reverse direction. Thus, the function of the engine is not affected.

A control apparatus of a hybrid vehicle includes: an engine; first and second motors; an output shaft connected to a driving wheel; a differential gear unit including at least four gear elements, each of which is connected to the engine, the first and second motors and the output shaft; a one-way clutch disposed between an output member and a fixing member of the engine for preventing the engine from rotating in a reverse direction and for allowing the engine to rotate in a forward direction; target output torque setting means for setting a target output torque corresponding to the output torque output to the output shaft; applying torque setting means for setting a predetermined one-way clutch torque to act on the one-way clutch; and control torque calculating means for calculating a control torque as a target for electrically controlling the first and second motors based on the target output torque and the torque caused to act on the one-way clutch torque; and torque control means for controlling torque of the first and second motors in accordance with the control torque.

In a control apparatus of a hybrid vehicle, the one-way clutch torque is generated in a direction where the one-way clutch is locked.

In a control apparatus of a hybrid vehicle, the one-way clutch torque is set corresponding to the target output torque.

In a control apparatus of a hybrid vehicle, the one-way clutch torque is increased as the target output torque becomes greater during driving forward.

In a control apparatus of a hybrid vehicle, the one-way clutch torque is set at zero when the target output torque becomes greater than a predetermined value in a reverse direction during driving backward.

In a control apparatus of a hybrid vehicle, the control torque is represented by target motor torque TM1*, TM2*, and when it is assumed that the target output torque is TO* and the one-way clutch torque is TOWC, the target motor torque TM1*, TM2* are expressed by the following equations:

$$TM1^* = K1 \cdot TO^* + K5 \cdot TOWC, \text{ and } TM2^* = K2 \cdot TO^* + K6 \cdot TOWC,$$

where K1, K2, K5, K6 are constants.

A control method of a hybrid vehicle of the invention is applied to the hybrid vehicle including an engine; first and second motors, an output shaft connected to a driving wheel; and a differential gear unit including at least four gear elements, each of which is connected to the engine, the first and second motors and the output shaft.

The control method includes the steps of: setting a target output torque corresponding to the output torque output to the output shaft; calculating a control torque as a target for electrically controlling the first and second motors based on the target output torque; controlling the torque of the first and second motors in accordance with the control torque, and bringing the engine into a non-rotational state while keeping the engine stopped.

DETAILED DESCRIPTION OF PREFERRED EMBODIMENTS

Embodiments of the invention will be described in detail hereinafter with reference to the drawings.

Figure 1:
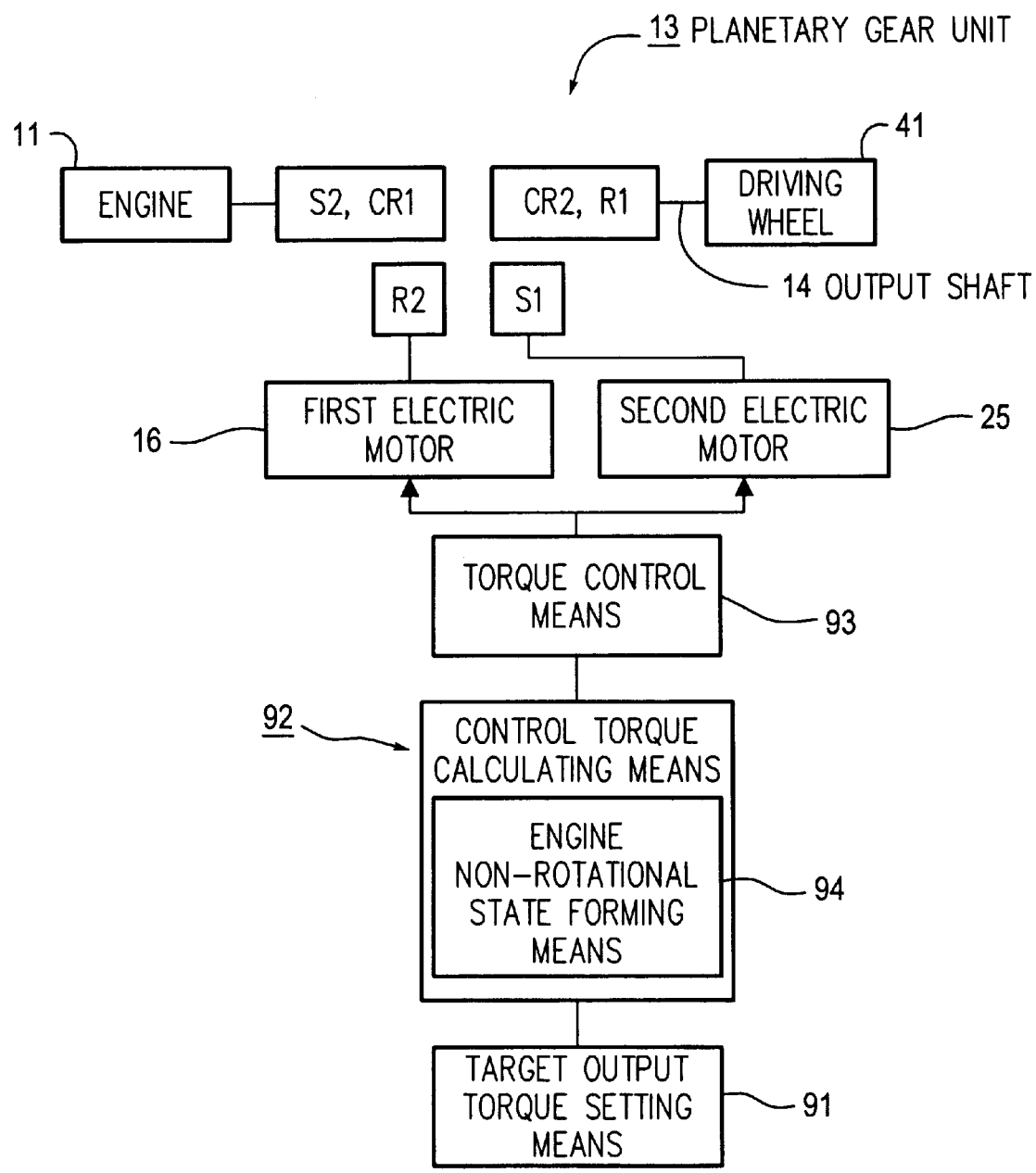
FIG. 1 is a function block diagram of a control apparatus of a hybrid type vehicle in accordance with a first embodiment of the invention.

FIG. 1 is a function block diagram of a hybrid vehicle control apparatus in accordance with a first embodiment of the invention.

In the drawing, a reference numeral 11 represents an engine; 16 represents a first electric motor, 25 represents a second electric motor, 14 represents an output shaft connected to drive wheels 41, 13 represents a planetary gear unit as a differential gear device having at least four gear elements, that is, a sun gear S1, a sun gear S2 and a carrier CR1, a ring gear R2, and a carrier CR2 and a ring gear R1, in which the sun gear S2 and the carrier CR1, the ring gear R2, the sun gear S1, and the carrier CR2 and the ring gear R1 are connected to the engine 11, the first and second electric motors 16, 25 and the output shaft 14, respectively; 91 represents target output torque setting means for setting a target output torque corresponding to the torque output to the output shaft 14; 92 represents control torque calculating means for calculating target electric motor torque TM1*, TM2* as the target control torque for electrically controlling the first and second electric motors 16, 25; 93 represents torque control means for controlling torque of the first and second electric motors 16, 25 corresponding to the target electric motor torque TM1*, TM2*; and 94 represents engine non-rotational state forming means for bringing the engine 11 into a non-rotational state in the stopped state of the engine 11.

Figure 2:
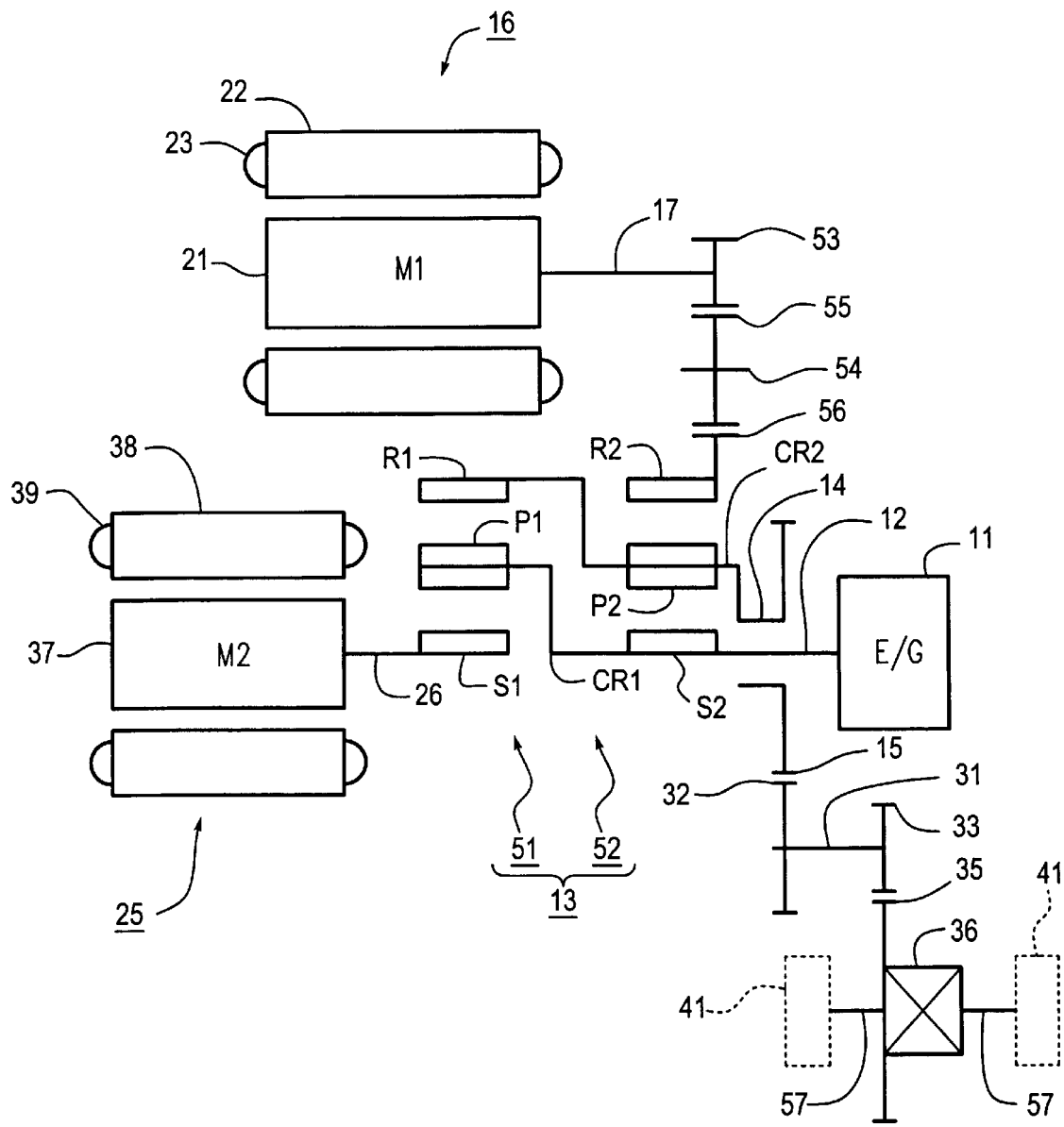
FIG. 2 is a conceptual diagram of the hybrid type vehicle in the first embodiment of the invention.

FIG. 2 is a conceptual diagram of a hybrid vehicle in the first embodiment of the invention.

In the drawing, a reference numeral 11 represents the engine (E/G); 13 represents the planetary gear unit as a differential gear device having first and second planetary sets 51, 52; 14 represents the output shaft of the planetary gear unit 13; 15 represents a counter drive gear provided on the output shaft 14; 16 represents the first electric motor (M1); and 25 represents the second electric motor (M2). The output shaft 14 is connected to the drive wheels 41 via the counter drive gear 15, a counter shaft 31, a counter driven gear 32, a pinion drive gear 33, a large ring gear 35, a differential apparatus 36, and drive shafts 57.

The first planetary set 51 is made up of the sun gear S1, pinions P1 meshed with the sun gear S1, the ring gear R1 meshed with the pinions P1, and the carrier CR1 rotatably supporting the pinions P1. The second planetary set 52 is made up of the sun gear S2, pinions P2 meshed with the sun gear S2, the ring gear R2 meshed with the pinions P2, and the carrier CR2 rotatably supporting the pinions P2. In the planetary gear unit 13, the carrier CR1 and the sun gear S2 are interconnected, and the ring gear R1 and the carrier CR2 are interconnected. The sun gear S1, the carrier CR1 and the ring gear R1 constitute three gear elements. The sun gear S2, the carrier CR2 and the ring gear R2 constitute three gear elements.

The engine 11 is connected with the sun gear S2 and the carrier CR1, that is, a first gear element. The first electric motor 16 is connected with the ring gear R2, that is, a second gear element. The second electric motor 25 is connected with the sun gear S1, that is, a third gear element. The output shaft 14 is connected with the carrier CR2 and the ring gear R1, that is, a fourth gear element.

For the aforementioned connections, the engine 11, the first electric motor 16 and the second electric motor 25 are provided with output shafts 12, 17 and a transmission shaft 26 as output members, respectively. The output shaft 12 is connected to the sun gear S2. The output shaft 17 is connected to the ring gear R2 via a drive gear 53 mounted on the output shaft 17, a counter gear 55 that is disposed rotatably relative to a counter shaft 54 and that is meshed with the drive gear 53, and a driven gear 56 mounted on the ring gear R2. The transmission shaft 26 is connected to the sun gear S1.

The first electric motor 16 is substantially made up of a rotor 21 that is fixed to the output shaft 17 and that is rotatably disposed, a stator 22 disposed around the rotor 21, and coils 23 wound on the stator 22. The coils 23 are connected to a not-shown battery that is provided as an electricity storage member. The first electric motor 16 is driven by current supplied from the battery, and generates and outputs rotation to the output shaft 17. Although this embodiment employs the battery as an electricity storage member, it is also possible to use a capacitor, a flywheel, a pressure accumulator, etc., instead of the battery.

The second electric motor 25 is substantially made up of a rotor 37 that is fixed to the transmission shaft 26 and that is rotatably disposed, a stator 38 disposed around the rotor 37, and coils 39 wound on the stator 38. The coils 39 are connected to the battery. The second electric motor 25 generates electric power from rotation inputted via the transmission shaft 26, and thereby supplies current to the battery. Furthermore, the second electric motor 25 is driven by current supplied from the battery, and thereby generates and outputs rotation to the transmission shaft 26.

In order to turn the drive wheels 41 in the same direction as revolution of the engine 11, a counter shaft 31 is disposed. A counter driven gear 32 and a pinion drive gear 33 are fixed to the counter shaft 31. The counter driven gear 32 and the counter drive gear 15 are meshed so that rotation is transmitted from the counter drive gear 15 to the counter driven gear 32 while the rotating direction is reversed.

A large ring gear 35 is fixed to a differential device 36. The large ring gear 35 is meshed with the pinion drive gear 33. Therefore, rotation transmitted to the large ring gear 35 is distributed and transmitted to the drive wheels 41 by the differential device 36 via drive shafts 57.

The operation of the hybrid type vehicle constructed as described above will next be described.

Figure 5:
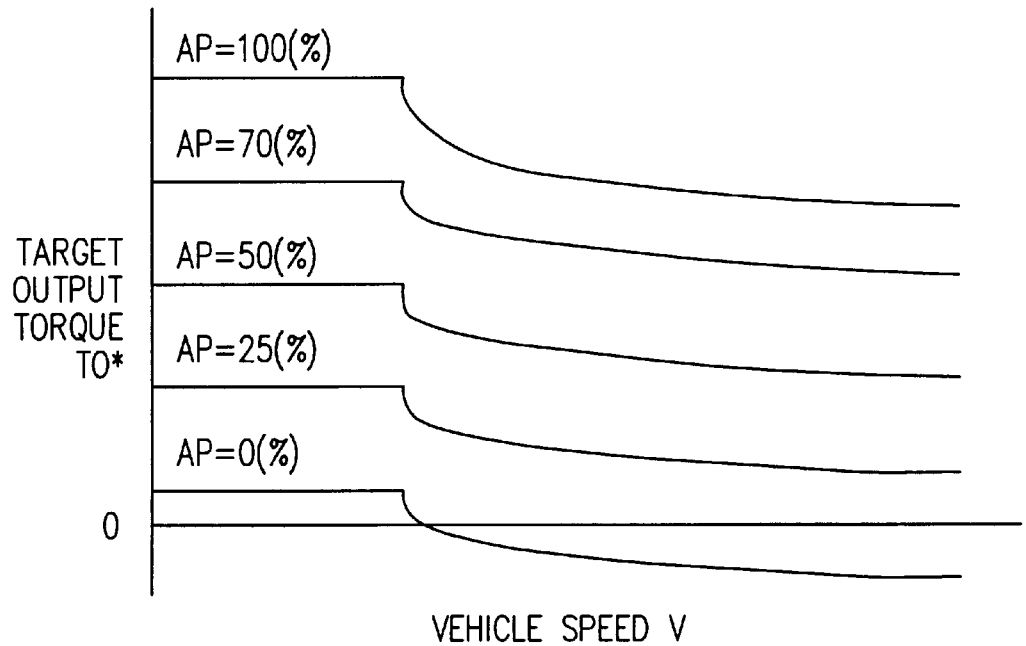
FIG. 5 is a diagram indicating a target output torque map regarding a drive shaft in the first embodiment of the invention.
Figure 6:
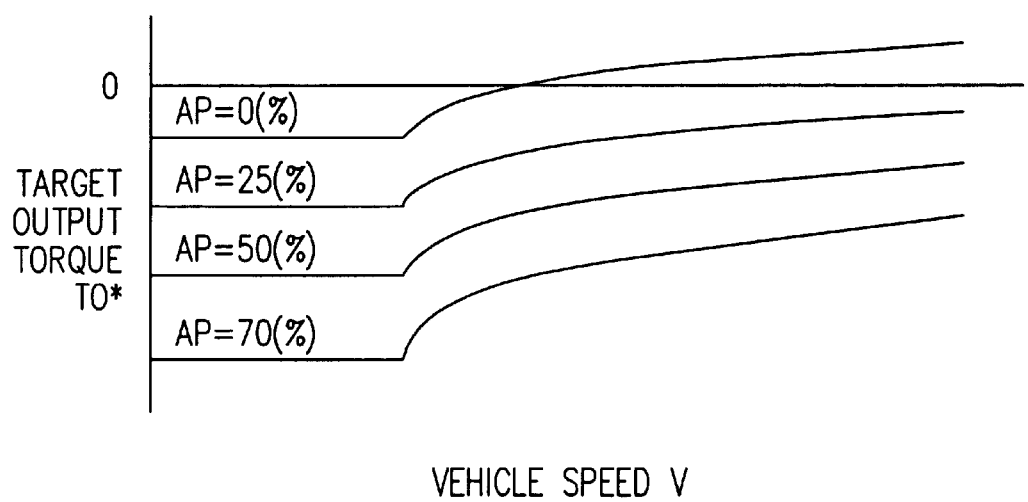
FIG. 6 is a diagram showing a reverse torque map in the first embodiment of the invention.

In FIGS. 5 and 6, a lateral axis shows the vehicle speed, and a vertical axis shows the target output torque TO* of the driving shaft 57 (FIG. 2).

Figure 3:
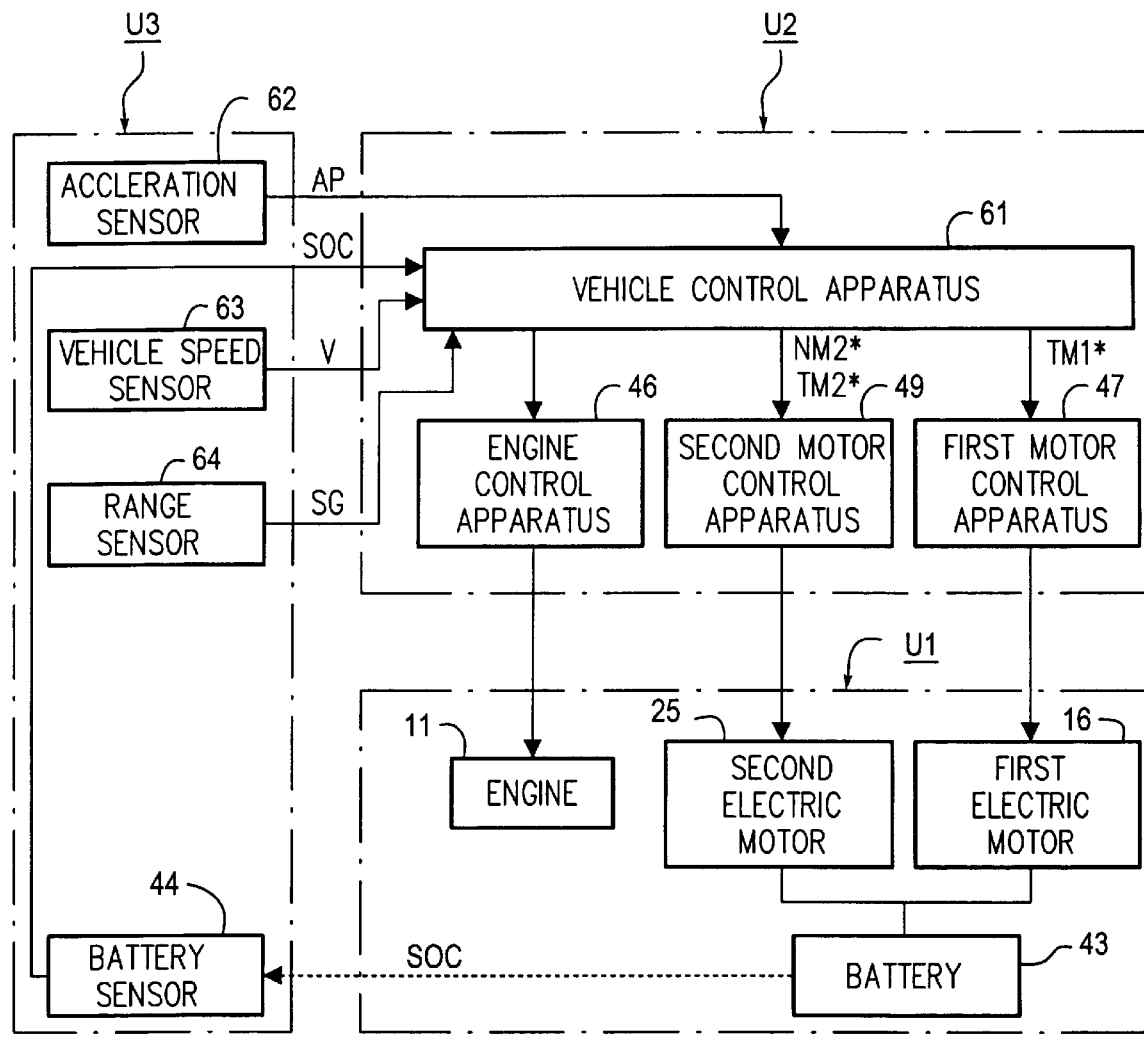
FIG. 3 is a block diagram of a control circuit of the hybrid type vehicle in the first embodiment of the invention.

In FIG. 3, U1 represents a drive section; U2 represents a control section; and U3 represents a sensor section. The engine 11, the first and second electric motors 16, 25, and a battery 43 are disposed in the drive section U1. Disposed in the control section U2 are a vehicle control device 61 formed by a CPU for performing overall control of the hybrid type vehicle, an engine control device 46 for controlling the engine 11, a first motor control device 47 for controlling the first electric motor 16, a second motor control device 49 for controlling the second electric motor 25, and a not-shown memory provided as storage means. Disposed in the sensor section U3 are a battery sensor 44 provided as a remaining stored electricity detecting means for detecting the remaining battery level SOC as the remaining amount of electricity stored in the battery 43, an accelerator sensor 62 disposed on a not-shown accelerator pedal for detecting the amount of accelerator operation AP, that is, the amount of depression of the accelerator pedal, a vehicle speed sensor 63 provided as a vehicle speed detecting means for detecting the vehicle speed V, and a range (position) sensor 64 as range (position) detecting means disposed on a shift lever as speed-selecting means (not shown) for detecting a range (position) selected by the shift lever are disposed in the sensor section U3. In the embodiment, it is possible to select any one of the forward range (position), reverse the range (position), neutral range (position), parking range (position) and the like by operating the shift lever. The acceleration opening AP, the vehicle speed V, a range (position) signal SG and the battery remaining level SOC are sent to the vehicle control apparatus 61.

It is possible to provide, in the sensor section U3, a electric motor rotation speed sensor as electric motor rotation speed detecting means for detecting rotation speed of the second electric motor 25, i.e., electric motor rotation speed NM2, and an engine rotation speed sensor as engine rotation speed detecting means for detecting rotation speed of the engine 11, i.e., engine rotation speed NE. In this case, the electric motor rotation speed NM2 is sent to the second electric motor control apparatus 49, and the engine rotation speed NE is sent to the engine control apparatus 46. The electric motor rotation speed sensor is disposed to face the transmission shaft 26, and the engine rotation speed sensor is disposed to face the output shaft 12.

In the hybrid vehicle of the above-described structure, the target output torque setting means 91 (FIG. 1) of the vehicle control apparatus 61 performs target output torque setting so as to set the target output torque TO* corresponding to an output torque TO output to the output shaft 14. For this purpose, the target output torque setting means 91 reads the acceleration opening AP, the vehicle speed V and the range (position) signal SG to judge whether forward range (position) is selected. When the forward range (position) is selected, a forward torque map shown in FIG. 5 in the memory is referred to, and the target output torque TO* corresponding to the acceleration opening AP and the vehicle speed V is set. When the reverse range (position) is selected, a reverse torque map shown in FIG. 6 in the memory is referred to, target output torque TO* corresponding to the acceleration opening AP and the vehicle speed V is set.

Then, engine operating necessity judging means MS2 (not shown) of the vehicle control apparatus 61 judges necessity of operating the engine, and judges whether or not the engine 11 should be operated. For this purpose, the engine operating necessity judging means MS2 reads the battery remaining level SOC and judges whether the battery remaining level SOC is lower than a battery remaining threshold $SOC_{TH}$. When the battery remaining level SOC is lower than the battery remaining threshold $SOC_{TH}$, the engine 11 is operated to charge the battery 43, and when the battery remaining level SOC is equal to or higher than the battery remaining threshold $SOC_{TH}$, the engine 11 is held stopped. The vehicle control apparatus 61 judges whether or not the target output torque TO* is greater than a target output torque threshold $TO*_{TH}$. When the target output torque TO* is greater than the target output torque threshold $TO*_{TH}$, the engine 11 is operated to utilize the engine torque TE, and when the target output torque TO* is greater than the target output torque threshold $TO*_{TH}$, the engine 11 is kept stopped.

The engine 11 is operated by the vehicle control apparatus 61 that performs control of the first electric motor to drive the first and second electric motors 16, 25.

Subsequently, the vehicle control device 61 performs an engine target operation state setting process. Based on the target output torque TO* and the vehicle speed V, the means calculates a drive force (power) needed to output the target output torque TO* to the drive shafts 57, that is, the needed drive power PO, as in the following expression, and thereby sets an engine target operation state.

$$PO=TO*\cdot EV$$

Next, the engine target operation state setting processing means MS2 needs the remaining battery level SOC, and adds a correction drive power Ph to the needed drive power PO corresponding to the remaining battery level SOC, thereby correcting the needed drive power PO. The corrected needed drive power PO' is given as follows.

$$PO'=PO+Ph$$

If the remaining battery level SOC is low, the needed drive power PO is increased (Ph>0) in order to cause the first electric motor 16 to generate electric power and charge the battery 43 by supplying current thereto. If the remaining battery level SOC is high, the needed drive power PO is reduced (Ph<0) so that electric power is consumed by supplying current from the battery 43 to the second electric motor 25.

Then, the vehicle control apparatus 61 refers to an engine target driving state map in the memory, and calculates a target engine rotation speed NE* and target engine torque TE* such that the necessary power PO' is output from the engine 11, i.e., the power calculated by multiplying the engine torque TE by the engine rotation speed NE becomes the necessary power PO'.

Next, the vehicle control apparatus 61 refers to a torque, fuel injection amount map, a torque, throttle opening map and the like in the memory such that the target engine torque TE* is output, reads fuel injection amount and the throttle opening and the like corresponding to the target engine torque TE*, and sends the fuel injection amount, the throttle opening and the like to the engine control apparatus 46. Upon receipt of the fuel injection amount, the throttle opening and the like, the engine control apparatus 46 controls the fuel injection amount, the throttle opening and the like.

Next, the vehicle control apparatus 61 calculates the motor rotation speed NM2 that is a target of the second electric motor 25, i.e., a target motor rotation speed NM2* as the target value for the second electric motor 25 based on the vehicle speed V and the target engine rotation speed NE*, and sends the target motor rotation speed NM2* to the second motor control apparatus 49.

Then, the second electric motor control apparatus 49 electrically controls the rotation speed of the second electric motor 25 such that the electric motor rotation speed NM2 detected by the electric motor rotation speed sensor becomes the target electric motor rotation speed NM2*. That is, current supplied to the second electric motor 25 is feedback controlled such that a deviation ΔNM2 between the motor rotation speed NM2 and the target motor rotation speed NM2* becomes zero.

Next, the vehicle control apparatus 61 controls electric motor torque TM1. In this case, as electric motor rotation speed NM1 of the first electric motor 16 is varied, first inertial torque IM1 is generated by moment of inertial of the rotation elements from the rotor 21 to the ring gear R2, i.e., of the rotor 21, the output shaft 17, the drive gear 53, the counter shaft 54, the counter gear 55, the driven gear 56 and the ring gear R2. As the electric motor rotation speed NM2 varies, second inertial torque IM2 is generated by moment of inertial of the rotation elements from the rotor 37 to the sun gear S1, i.e., of the rotor 37, the transmission shaft 26 and the sun gear S1. The vehicle control apparatus 61 corrects the target electric motor torque tM1* by an amount corresponding to the first and second inertial torque IM1 and IM2, and the corrected torque is sent to a first electric motor control apparatus 47. Upon receipt of the target electric motor torque tM1*, the first electric motor control apparatus 47 controls the torque of the first electric motor 16 such that the target electric motor torque tM1* is output. For this purpose, the vehicle control apparatus 61 refers to a first torque current value map in the memory, reads current value corresponding to the target electric motor torque tM1*, and supplies the current of the current value to the first electric motor 16.

On the other hand, when the engine 11 is not operated, electric motor control means MS3 (not shown) of the vehicle control apparatus 61 controls the second electric motor, and drives the first and second electric motors 16, 25 in the state where the engine 11 is stopped.

Figure 7:
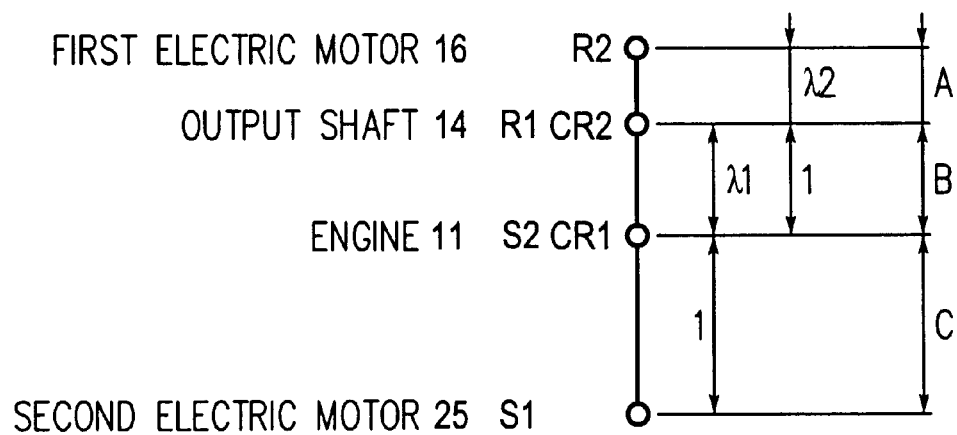
FIG. 7 is a diagram showing a sub-routine of a first electric motor control process in the first embodiment of the invention.

Referring to FIG. 7, if the number of teeth of the sun gear S1 of the first planetary set 51 is represented by ZS1 and the number of teeth of the ring gear R1 thereof is represented by ZR1, the ratio λ1 of the number of teeth ZS1 to the number of teeth ZR1 is given by the following equation.

$$\lambda 1 = ZS1/ZR1$$

If the number of teeth of the sun gear S2 of the second planetary set 52 is represented by ZS2 and the number of teeth of the ring gear R2 thereof is represented by ZR2, the ratio λ2 of the number of teeth ZS2 to the number of teeth ZR2 is given by the following equation.

$$\lambda 2 = ZS2/ZR2$$

Assuming that the ratio of the rotation speed of the ring gear R1 and the carrier CR2 to the rotation speed of the ring gear R2 is represented as follows:

$$A = 1$$

and that the ratio of the rotation speed of the carrier CR1 and the sun gear S2 to the rotation speed of the ring gear R1 and the carrier CR2 is represented by B, and that the ratio of the rotation speed of the sun gear S1 to the rotation speed of the carrier CR1 and the sun gear S2 is represented by C, the ratios B, C are given as:

$$B = \lambda 1,$$

and $$C = \lambda 1 \cdot E \lambda 2$$

Figure 8:
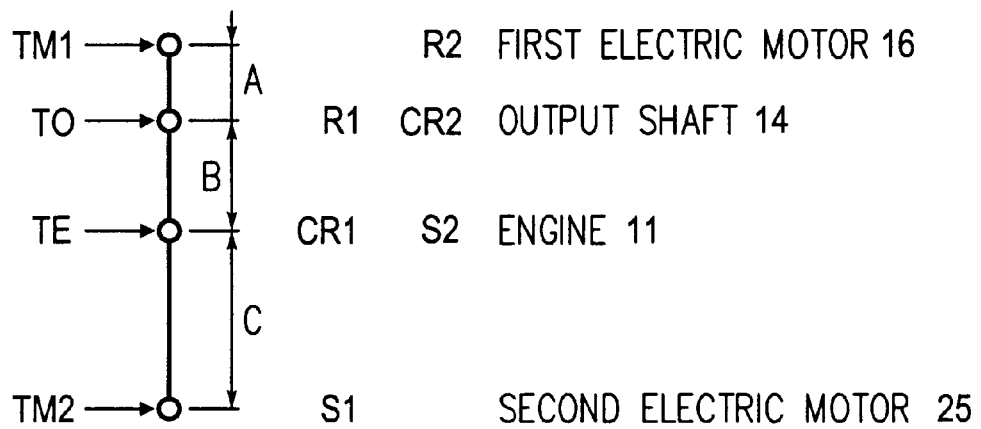
FIG. 8 is a diagram showing torque balance in the first embodiment of the invention.

Based on the torque diagram shown in FIG. 8, a balance equation of the torque in the planetary gear unit 13 is considered. Assuming that the output torque output to the output shaft 14 from the planetary gear unit 13 through the carrier CR2 is defined as TO, electric motor torque TM1 generated by the first electric motor 16 and input to the planetary gear unit 13 through the ring gear R2, and electric motor torque TM2 generated by the second electric motor 25 and input to the planetary gear unit 13 through the sun gear S1 are expressed by the following equations.

$$TM1 = -((B+C)/(A+B+C)TO - (C/(A+B+C))TE$$

$$TM2 = -(A/(A+B+C)TO - ((A+B)/(A+B+C))TE$$

Assuming that a gear ratio from the planetary gear unit 13 to the driving shaft 57 is defined as GO, and a gear ratio from the first electric motor 16 to the planetary gear unit 13 is defined as GM1, each the target electric motor torque in the output shaft 17 and the transmission shaft 26, i.e., target electric motor torque TM1*, TM2* are expressed by the following equations.

$$TM1^* = -((B+C)/((A+B+C)GO \times GM1))TO^* - (C/(A+B+C)GM1))TE \quad (1)$$

$$TM2^* = -(A/((A+B+C)GO))TO^* - ((A+B)/(A+B+C))TE \quad (2)$$

In this case, the target electric motor torque TM1*, TM2* constitute the target control torque for electrically controlling torque of the first and second electric motors 16, 25. When the electric motor torque TM1 and TM2 are generated in the same direction as the engine torque TE when the engine 11 is driven, polarities of the motor torque TM1 and TM2 are positive. When the vehicle is driven by the first and second electric motors 16, 25 (when the vehicle is accelerated), polarity of the output torque TO is negative.

When the engine 11 is kept in the stopped state, i.e., when fuel is not burned and the engine torque TE is not generated, considering the balance equation between the first and second electric motor torque TM1, TM2 and output torque TO, the engine torque TE of the above equations (1) and (2) express the torque acting on the output shaft 12 from outside of the engine 11.

In this case, the engine 11 is not operated and kept in a stopped state, and non-rotational state of the engine 11 is formed. Therefore, in the above equations (1) and (2), the engine torque TE is brought to zero, and the target motor torque TM1*, TM2* is expressed as follows:

$$TM1^* = -((B+C)/(A+B+C)GO \times GM1))TO^* \quad (3)$$

$$= K1 \times TO^* \quad (4)$$

$$TM2^* = -(A/((A+B+C)GO))TO: \quad (5)$$

$$= K2 \times TO^* \quad (6)$$

where K1 and K2 are constants, each of which can be expressed by the following equations.

$$K1 = -((B+C)/(A+B+C)GO \times GM1))$$

$$K2 = -(A/((A+B+C)GO))$$

For this purpose, the control torque calculating means 92 of the motor control means MS3 calculates the target motor torque TM1, TM2* based on the equations (3) to (6) so as to send the target motor torque TM1* to the first motor control apparatus 47, and the target motor torque TM2* to the second motor control apparatus 49. In the present embodiment, the non-rotational state forming means 94 and the applied torque setting means (not shown) of the control torque calculating means 92 bring the torque applied to the output shaft 12, i.e., the engine torque TE to zero so as to form the non-rotational state of the engine 11. The target output torque TO* in the equations (3) to (6) is assumed to be negative when the vehicle is driven by the first and second electric motors 16, 25 due to relation of the balance equation of the torque. Therefore, it is necessary to substitute the target output torque TO* into the equations (3) to (6) after the positive and negative of the target output torque TO* set by the target output torque setting means 91 is reversed. When torque control means MS4 (not shown) of the first electric motor control apparatus 47 upon receipt of the target electric motor torque TM1*, the torque control means MS4 controls the torque of the first electric motor 16 such that the target electric motor torque TM1* is output. For this purpose, the torque control means MS4 refers a second torque, current value map in the memory, reads current value corresponding to the target electric motor torque tM1*, and supplies current of the current value to the first electric motor 16. When torque control means MS5 (not shown) of the second electric motor control apparatus 49 receives the target electric motor torque TM2*, the torque control means MS5 controls torque of the second electric motor 25 such that the target electric motor torque TM2* is output. For this purpose, the torque control means MS5 refers a third torque, current value map in the memory, reads current value corresponding to the target electric motor torque TM2*, and supplies current of the current value to the second electric motor 25. The torque control means MS4 and MS5 constitute the torque control means 93.

Therefore, when the hybrid vehicle is allowed to move forward in a vehicle driving state (vehicle accelerating state), the first and second electric motors 16, 25 are controlled such that the engine torque TE becomes zero and output torque TO becomes the target output torque TO*. Therefore, a first torque diagram shown in FIG. 9 and a first rotation speed diagram shown in FIG. 10 can be obtained.

When a direction in which the motor torque TM1, TM2 are generated and a direction of rotation of the first and second electric motors 16, 25 are the same, the first and second electric motors 16, 25 are brought into a driving state. When the direction in which the motor torque TM1, TM2 are generated and the direction of rotation of the first and second electric motors 16, 25 are opposite, the first and second electric motors 16, 25 are brought into a non-driving state, generating regenerative current.

Figure 9:
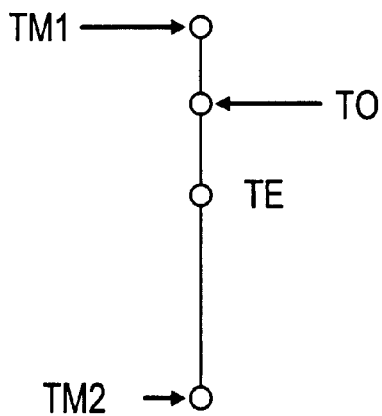
FIG. 9 is a first torque diagram at the time of forward driving in the first embodiment of the invention.
Figure 10:
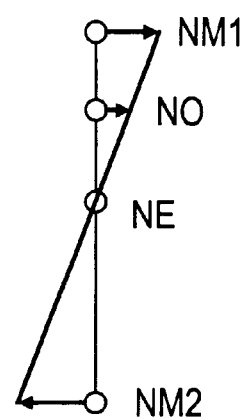
FIG. 10 is a first rotation speed at the time of forward driving in the first embodiment of the invention.

Therefore, in the state shown in FIGS. 9 and 10, the first electric motor 16 is in the driving state, and the second electric motor 25 is in the non-driving state. A term NO represents the rotation speed, i.e., output rotation speed of the output shaft 14.

Figure 11:
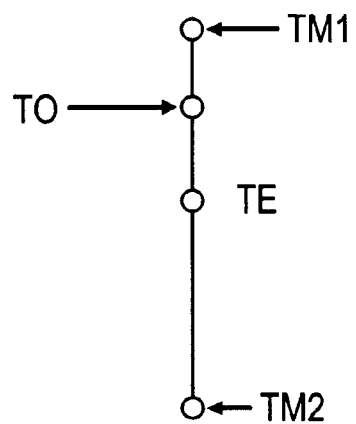
FIG. 11 is a second torque diagram at the time of forward driving in the first embodiment of the invention.
Figure 12:
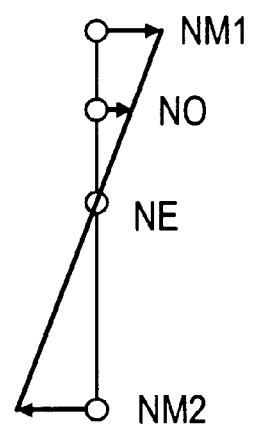
FIG. 12 is a second rotation speed at the time of forward driving in the first embodiment of the invention.

When the hybrid vehicle is allowed to move forward in a non-driving state (coast state), the first and second electric motors 16, 25 are controlled such that the engine torque TE becomes zero and the output torque TO becomes the target output torque TO*. As a result, a second torque diagram shown in FIG. 11 and a second rotation speed diagram shown in FIG. 12 can be obtained. In this case, the first electric motor 16 is brought into a non-driving state and the second electric motor 25 is brought into a driving state.

Figure 13:
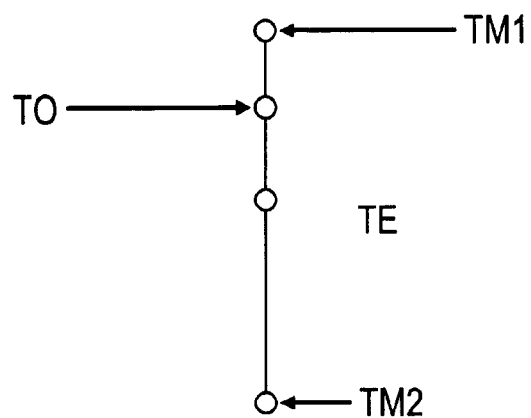
FIG. 13 is a first torque diagram at the time of reverse driving in the first embodiment of the invention.
Figure 14:
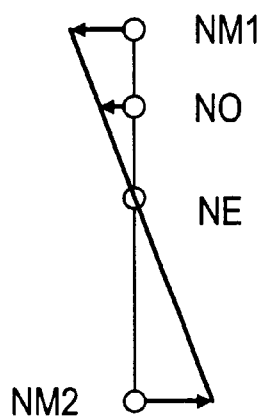
FIG. 14 is a first rotation speed at the time of reverse driving in the first embodiment of the invention.
Figure 15:
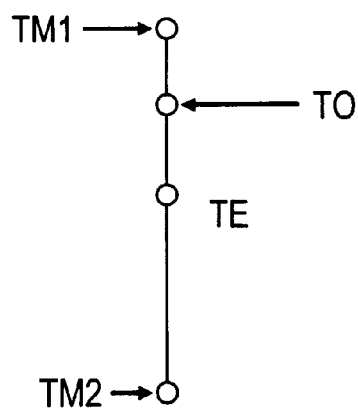
FIG. 15 is a second torque diagram at the time of reverse driving in the first embodiment of the invention.
Figure 16:
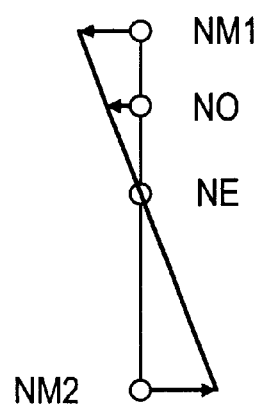
FIG. 16 is a second rotation speed at the time of reverse driving in the first embodiment of the invention.

When the hybrid vehicle is allowed to move backward, i.e., in reverse, in the driving state, the first and second electric motors 16, 25 are controlled such that the engine torque TE becomes zero and the output torque TO becomes the target output torque TO*. As a result, a first torque diagram shown in FIG. 13 and a first rotation speed diagram shown in FIG. 14 can be obtained. In this case, the first electric motor 16 is brought into a driving state, and the second electric motor 25 is brought into a non-driving state. When the hybrid vehicle is allowed to move backward in a vehicle non-driving state, the first and second electric motors 16, 25 are controlled such that the engine torque TE becomes zero and the output torque TO becomes the target output torque TO*, and a second torque diagram shown in FIG. 15 and a second rotation speed diagram shown in FIG. 16 can be obtained. In this case, the first electric motor 16 is brought into the non-driving state and the second electric motor 25 is brought into the driving state. When the electric motor torque TM1, TM2 are generated in the same direction as the engine torque TE when the engine 11 is driven, polarities of the electric motor torque TM1, TM2 are positive.

By setting the engine torque TE to zero and setting the target motor torque TM1*, TM2* based on the target output torque TO* in the state where the engine 11 is stopped, the motor torque TM1 and TM2 can be independently controlled. Therefore, it is possible to easily generate the target output torque TO*.

Further, since the engine torque TE is set to zero and the target electric motor torque TM1*, TM2* are set, the engine 11 in the stopped state is not rotated accompanied with driving of the first and second electric motors 16, 25. Therefore, it is possible to prevent loss of the output torque TO.

In the present embodiment, since the engine 11 is stopped and the engine rotation speed NE is set to zero, the electric motor rotation speed NM1, NM2 vary with the change in vehicle speed V. In this case, since the vehicle speed V changes at an extremely low speed, electric motor rotation speeds NM1, NM2 vary at extremely slow speeds. Therefore, it is not always necessary to correct the target motor torque TM1*, TM2* based on the inertial torque.

Figure 4:
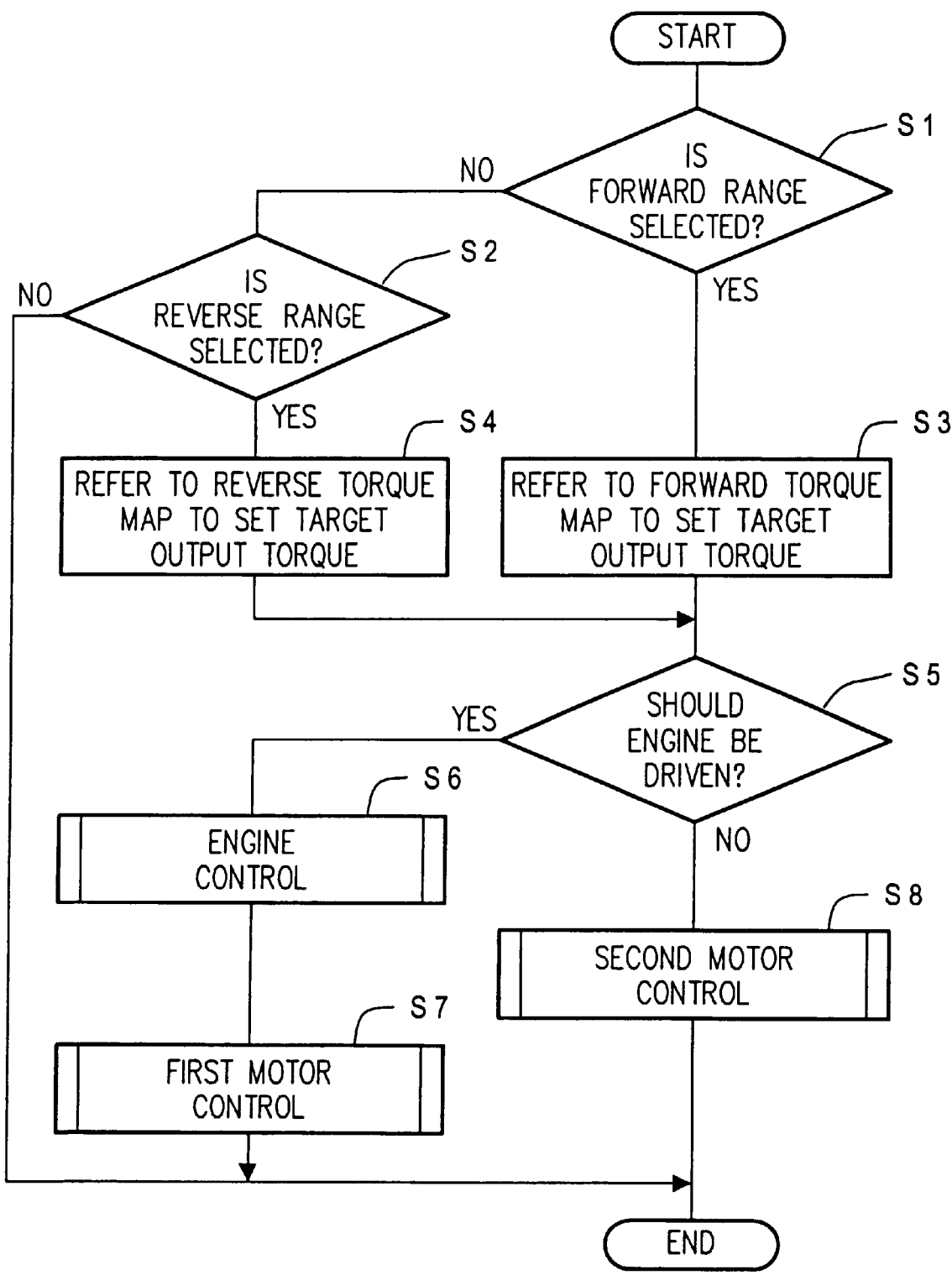
FIG. 4 is a main flow chart illustrating an operation of the hybrid type vehicle in the first embodiment of the invention.

The flowchart of FIG. 4 will next be described.

Step S1: It is judged whether or not forward range (position) is selected. If the forward range (position) is selected, the process proceeds to step S3, and the forward range (position) is not selected, the process proceeds to step S2.

Step S2: It is judged whether or not reverse range (position) is selected. If the reverse range (position) is selected, the process proceeds to step S4, and the reverse range (position) is not selected, and then the process is completed.

Step S3: A forward torque map is referred to, and the target output TO* is set.

Step S4: A reverse torque map is referred to, and the target output torque TO* is set.

Step S5: It is judged whether or not the engine 11 should be operated. If the engine 11 is operated, the process proceeds to step S6, and the engine 11 is not operated, and then the process proceeds to step S8.

Step S6: The engine is controlled.

Step S7: The first electric motor is controlled, and then the process is completed.

Step S8: The second electric motor is controlled, and then the process is completed.

In the present embodiment, since the engine torque TE is set to zero and the target electric motor torque TM1*, TM2* are set, the engine 11 in the stopped state is not rotated accompanied with driving of the first and second electric motors 16, 25. However, if the error is generated in control of the electric motor torque TM1, TM2, torque for rotating the engine 11 in normal or reverse direction is generated in the engine 11. Depending upon the type of the hybrid vehicle, if the engine 11 in the stopped state is rotated in the reverse direction, there is a possibility that the function of the engine 11 will be adversely affected.

A second embodiment of the invention in which the function of the engine 11 is not affected will be explained.

Figure 17:
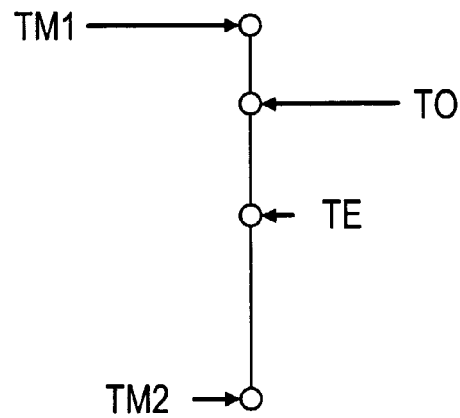
FIG. 17 is a first torque diagram at the time of forward driving in the second embodiment of the invention.
Figure 18:
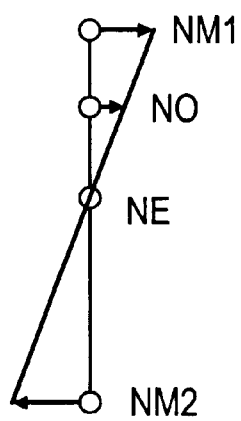
FIG. 18 is a first rotation speed at the time of forward driving in the second embodiment of the invention.
Figure 19:
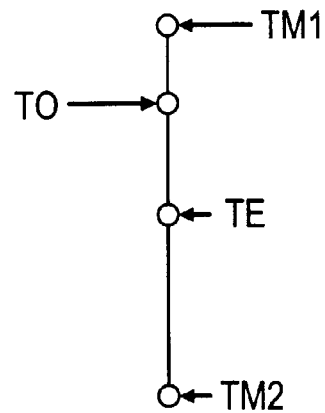
FIG. 19 is a second torque diagram at the time of forward driving in the second embodiment of the invention.
Figure 20:
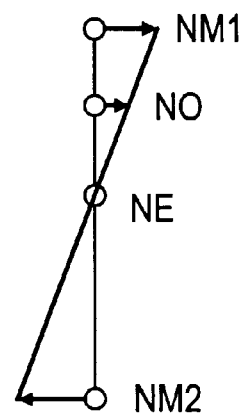
FIG. 20 is a second rotation speed at the time of forward driving in the second embodiment of the invention.
Figure 21:
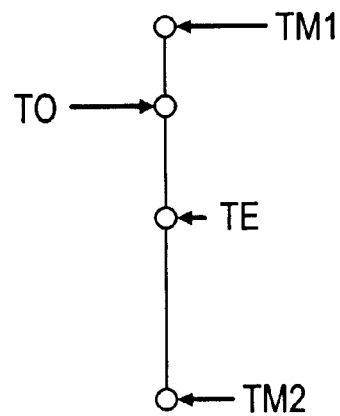
FIG. 21 is a first torque diagram at the time of reverse driving in the second embodiment of the invention.
Figure 22:
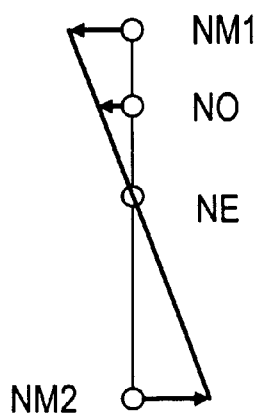
FIG. 22 is a first rotation speed at the time of reverse driving in the second embodiment of the invention.
Figure 23:
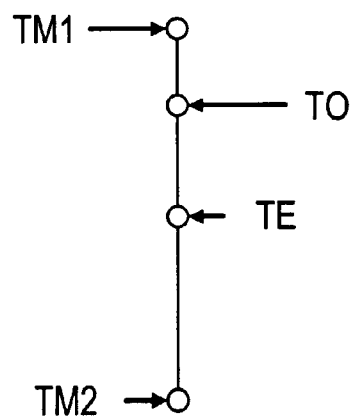
FIG. 23 is a second torque diagram at the time of reverse driving in the second embodiment of the invention.
Figure 24:
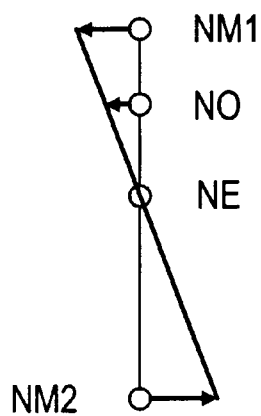
FIG. 24 is a second rotation speed at the time of reverse driving in the second embodiment of the invention.

FIG. 17 is a first torque diagram during driving forward in the second embodiment of the invention. FIG. 18 is a first rotation speed during driving forward in the second embodiment of the invention. FIG. 19 is a second torque diagram during driving forward in the second embodiment of the invention. FIG. 20 is a second rotation speed during driving forward in the second embodiment of the invention. FIG. 21 is a first torque diagram during driving in reverse in the second embodiment of the invention. FIG. 22 is a first rotation speed during driving in reverse in the second embodiment of the invention. FIG. 23 is a second torque diagram during driving in reverse in the second embodiment of the invention. FIG. 24 is a second rotation speed during driving in reverse in the second embodiment of the invention.

In this case, the engine operating necessity judging means MS2 (not shown) of the vehicle control apparatus 61 (FIG. 3) judges whether it is necessary to operate the engine, and judges whether the engine 11 should be operated. When the engine 11 is to be operated, the vehicle control apparatus 61 performs the engine control to operate the engine, and performs the first motor control to drive the first and second electric motors 16, 25. When the engine 11 is not to be operated, the motor control means MS3 (not shown) of the vehicle control apparatus 61 performs the second motor control to drive the first and second electric motors 16, 25.

At that time, the engine non-rotational state forming means 94 (FIG. 1) and the applied torque setting means of the motor control means MS3 bring the engine 11 into the non-rotational state. For this purpose, the engine non-rotational state forming means 94 and the applied torque setting means generate a predetermined engine torque TE to always energize the engine 11 and the output shaft 12 in the forward rotation direction. The control torque calculating means 92 of the motor control means MS3 calculates the target motor torque TM1*, TM2* based on the following equations (7) and (8) such that the target output torque TO* can be generated:

$$TM1^* = -(B+C)/((A+B+C)GO \cdot GM1))TO^* - \qquad (7)$$
$$(C/((A+B+C)GM1))TE$$
$$= K1 \cdot TO^* + K3 \cdot TE$$

$$TM2^* = -(A/((A+B+C)GO))TO^* - \qquad (8)$$
$$((A+B)/(A+B+C))TE$$
$$= K2 \cdot TO^* + K4 \cdot TE$$

The target motor torque TM1* is sent to the first motor control apparatus 47, and the target motor torque TM2* is sent to the second motor control apparatus 49. K1 to K4 are constants, each expressed as follows:

$$K1 = -((B+C)/((A+B+C)GO \cdot GM1))$$

$$K2 = -(A/((A+B+C)GO))$$

$$K3 = -(C/((A+B+C)GM1))$$

$$K4 = -((A+B)/(A+B+C))$$

The predetermined engine torque TE is set based on such a resistance that can hold the non-rotational state of the engine 11 kept stopped, i.e., based on sliding motion starting resistance torque TEF. In the present embodiment, the engine torque TE is set to a value smaller than the sliding motion starting resistance torque TEF.

Values of the motor torque TM1, TM2 are positive when they are generated in the same direction as that of the engine torque TE when the engine 11 is operated. When the vehicle is driven by the first and second electric motors 16, 25, the polarity of the output torque TO is negative. Therefore, when the target output torque TO* is substituted into the equations (7) and (8), it is necessary to reverse the polarity of the target output torque TO*. For example, when the accelerator pedal (not shown) is stepped and the hybrid vehicle is brought into the vehicle operating state by the first and second electric motors 16, 25, the polarity of the target output torque TO* calculated by referring to the torque map in the memory of the control section U2 is positive. However, the output torque TO acts on the planetary gear unit 13 as reaction force. Therefore, when the target output torque TO* is substituted into the equations (7) and (8), the polarity of the target output torque TO* is set to negative.

When the hybrid vehicle is allowed to run forward in the vehicle operating state, the first and second electric motors 16, 25 are controlled such that the engine torque TE is generated and the output torque TO becomes the target output torque TO*, and the first torque diagram shown in FIG. 17 and the first rotation speed diagram shown in FIG. 18 can be obtained. In this case, the first electric motor 16 is brought into the electric motor driving state, and the second electric motor 25 is brought into the electric motor non-driving state.

When the hybrid vehicle is allowed to move forward in the vehicle non-driving state, the first and second electric motors 16, 25 are controlled such that the engine torque TE is generated and the output torque TO becomes the target output torque TO*, and the second torque diagram shown in FIG. 19 and the second rotation speed diagram shown in FIG. 20 can be obtained. In this case, the first electric motor 16 is brought into the electric motor non-driving state, and the second electric motor 25 is brought into the electric motor driving state.

When the hybrid vehicle is allowed to move backward, i.e., in reverse, in the vehicle driving state, the first and second electric motors 16, 25 are controlled such that the engine torque TE is generated and the output torque TO becomes the target output torque TO*, and the first torque diagram shown in FIG. 21 and the first rotation speed diagram shown in FIG. 22 can be obtained. In this case, the first electric motor 16 is brought into the electric motor driving state, and the second electric motor 25 is brought into the electric motor non-driving state. When the hybrid vehicle is allowed to move backward in the vehicle non-driving state, the first and second electric motors 16, 25 are controlled such that the engine torque TE is generated and the output torque TO becomes the target output torque TO*, and the second torque diagram shown in FIG. 23 and the second rotation speed diagram shown in FIG. 24 can be obtained. In this case, the first electric motor 16 is brought into the electric motor non-driving state, and the second electric motor 25 is brought into the electric motor driving state. As shown in FIGS. 17 to 24, when the output torque TO and the engine torque TE are varied in magnitude, the motor driving state and the motor non-driving state may be changed in some cases.

In this case, the motor torque TM1, TM2 acts on the planetary gear unit 13 to rotate the engine 11 in the forward direction, but since the engine 11 is stopped, the engine torque TE acts on the planetary gear unit 13 as reaction force. Therefore, in the torque diagram, the engine torque TE is generated in a direction opposite from the engine torque TE generated by driving the engine 11 in the engine control processing, and the polarity of the engine torque TE is negative. Even if the engine torque TE is generated, since the engine torque TE is smaller than the sliding motion starting resistance torque TEF, the engine 11 is not rotated. Therefore, the engine rotation speed NE in the rotation speed diagram is zero.

The engine torque TE is generated in this manner, and the engine 11 and the output shaft 12 are energized in the forward rotation direction. Therefore, even if error is generated in the control of the electric motor torque TM1, TM2 and torque for rotating the engine 11 in the forward or reverse direction is generated in the engine 11, it is not rotated in the reverse direction although it may rotate in the forward direction. The function of the engine 11, thus, cannot be affected by the error.

Since the sliding motion starting resistance torque TEF varies with the temperature of the engine 11, it is possible to set the engine torque TE to a small value when the temperature of the engine 11 is high, and to a large value when the temperature of the engine 11 is low.

Next, a third embodiment of the invention will be hereinafter described. In this embodiment, the engine 11 is prevented from rotating in the reverse direction without generating the engine torque TE. Members having the same functions as those in the first embodiment will be designated with the same reference numerals, and explanations thereof will be omitted.

Figure 25:
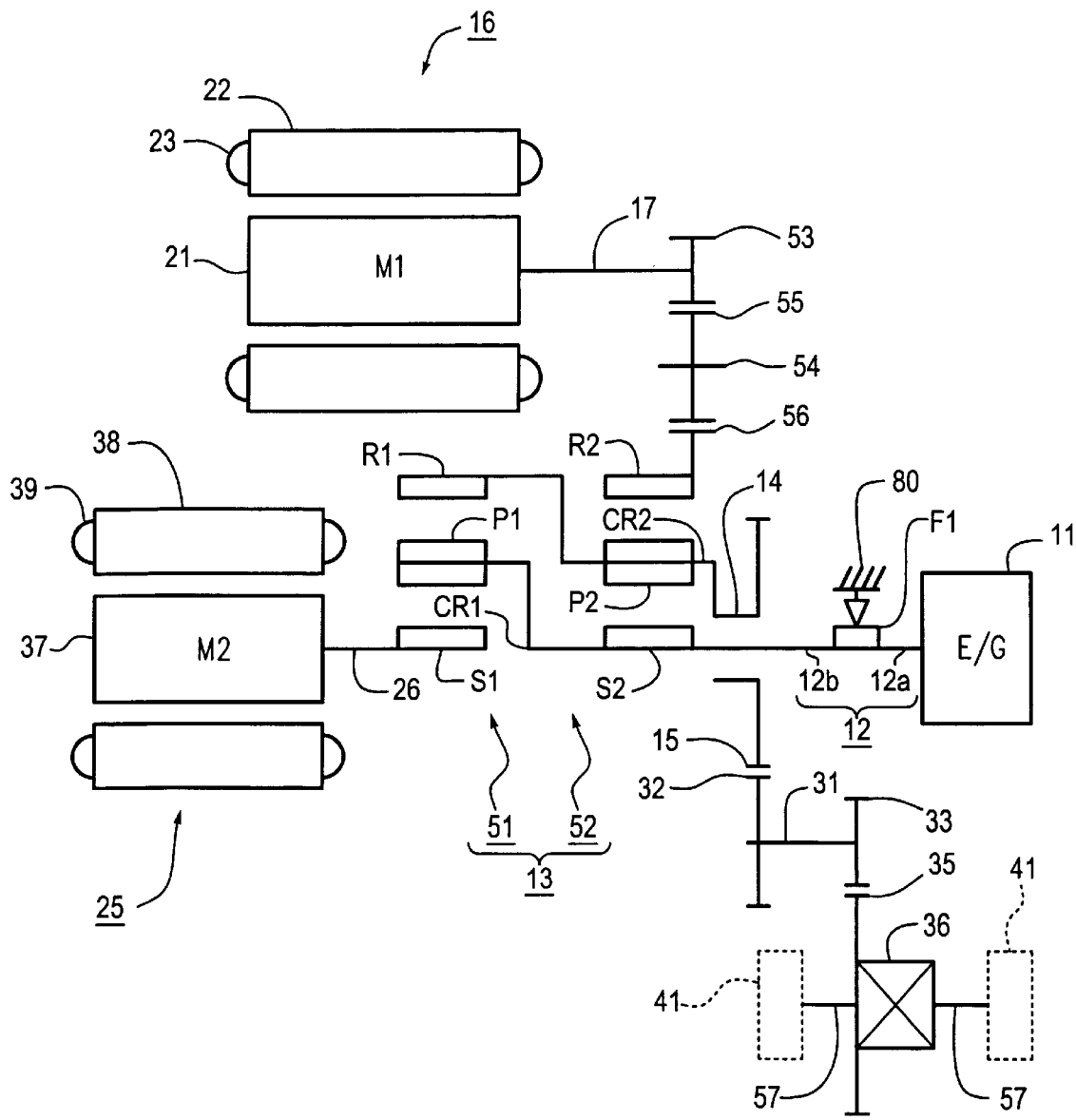
FIG. 25 is a key map of a hybrid vehicle in a third embodiment of the invention.
Figure 26:
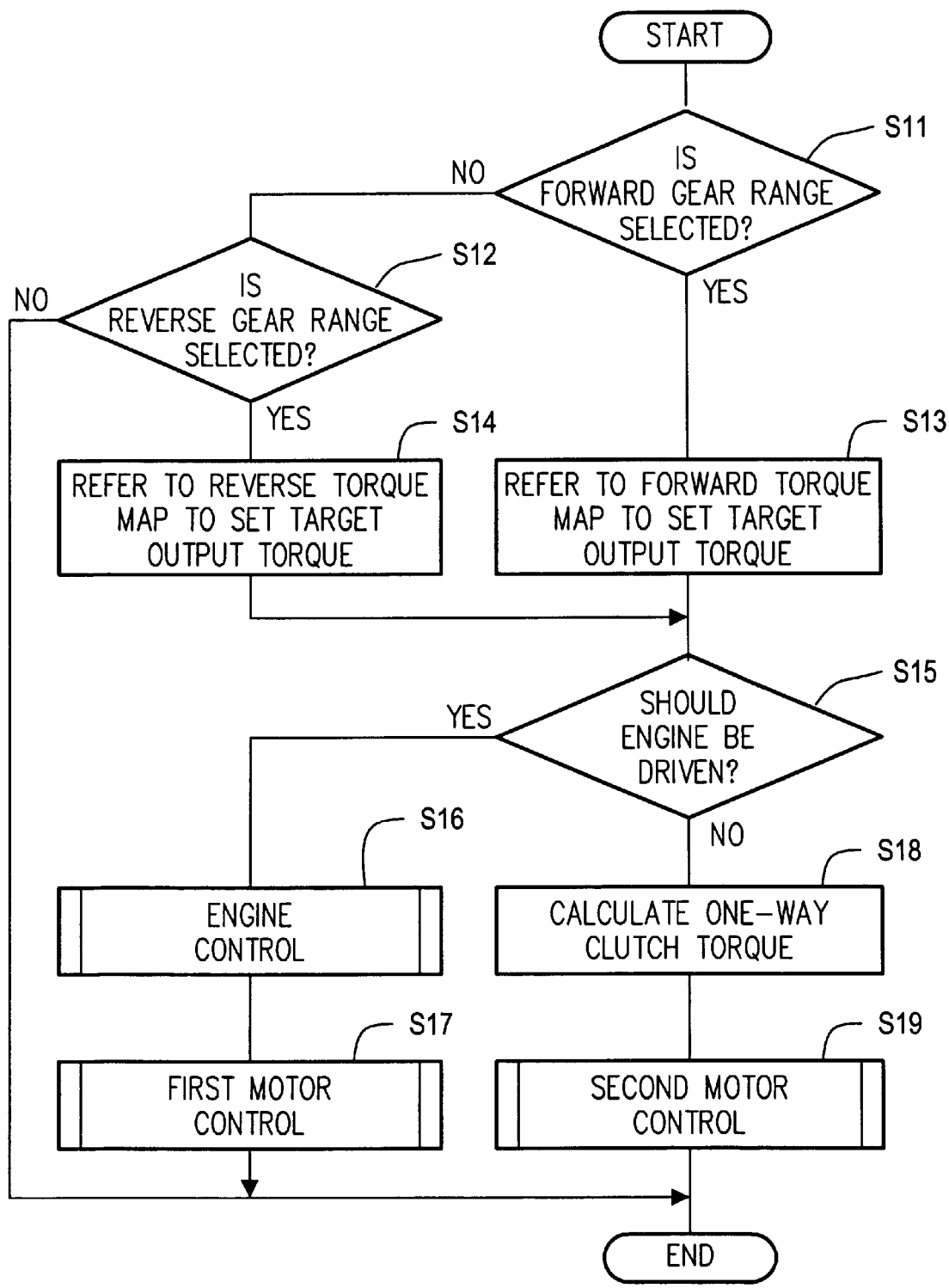
FIG. 26 is a flowchart showing operation of the hybrid vehicle in the third embodiment of the invention.
Figure 27:
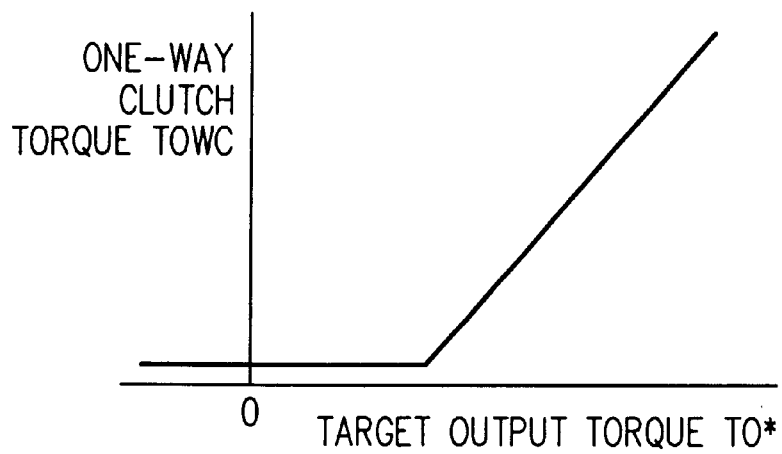
FIG. 27 is a torque map of a one-way clutch for forward driving in the third embodiment of the invention.
Figure 28:
FIG. 28 is a torque map of a one-way clutch for reverse driving in the third embodiment of the invention.
Figure 29:
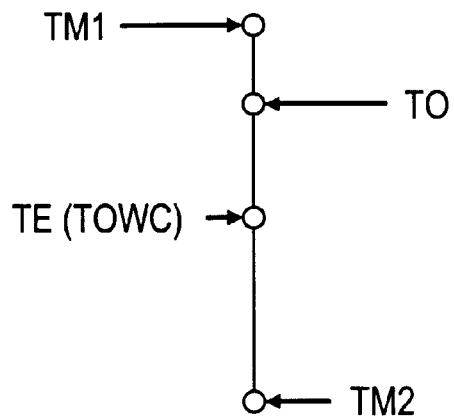
FIG. 29 is a first torque diagram at the time of forward driving in the third embodiment of the invention.
Figure 30:
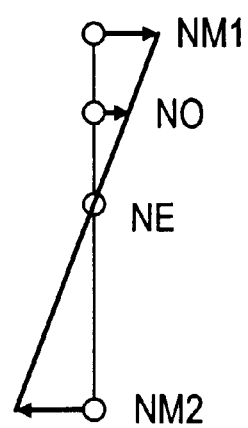
FIG. 30 is a first rotation speed at the time of forward driving in the third embodiment of the invention.
Figure 31:
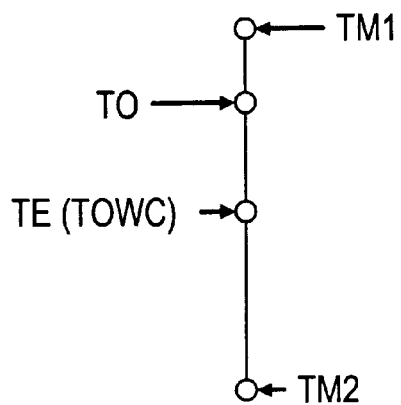
FIG. 31 is a second torque diagram at the time of forward driving in the third embodiment of the invention.
Figure 32:
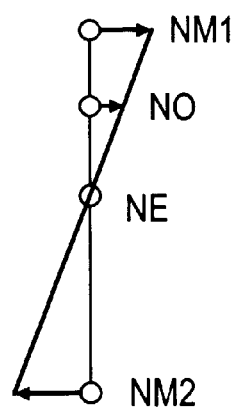
FIG. 32 is a second rotation speed at the time of forward driving in the third embodiment of the invention.
Figure 33:
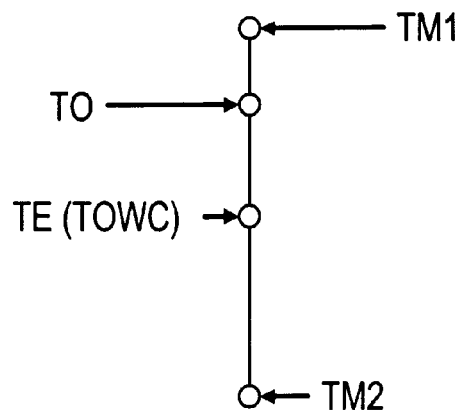
FIG. 33 is a first torque diagram at the time of reverse driving in the third embodiment of the invention.
Figure 34:
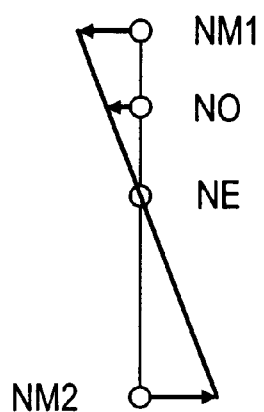
FIG. 34 is a first rotation speed at the time of reverse driving in the third embodiment of the invention.
Figure 35:
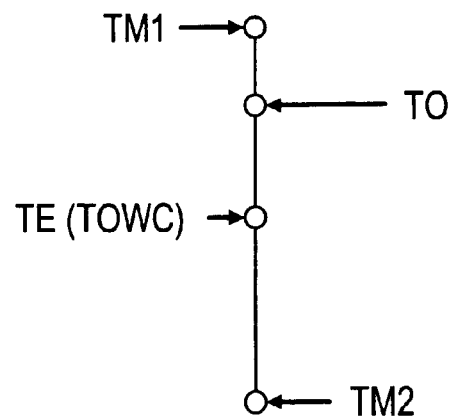
FIG. 35 is a second torque diagram at the time of reverse driving in the third embodiment of the invention.
Figure 36:
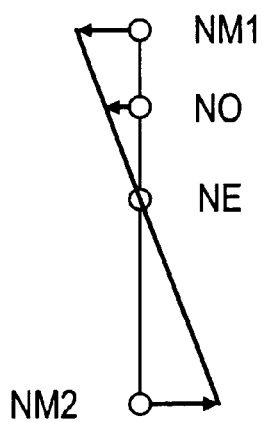
FIG. 36 is a second rotation speed at the time of reverse driving in the third embodiment of the invention.

FIG. 25 is a key map of a hybrid vehicle in a third embodiment of the invention. FIG. 26 is a flowchart showing operation of the hybrid vehicle in the third embodiment of the invention. FIG. 27 is a torque map of a one-way clutch for forward driving in the third embodiment of the invention. FIG. 28 is a torque map of a one-way clutch for backward driving in the third embodiment of the invention. FIG. 29 is a first torque diagram during driving forward in the third embodiment of the invention. FIG. 30 is a first rotation speed diagram during driving forward in the third embodiment of the invention. FIG. 31 is a second torque diagram during driving forward in the third embodiment of the invention. FIG. 32 is a second rotation speed diagram during driving forward in the third embodiment of the invention. FIG. 33 is a first torque diagram during driving in reverse in the third embodiment of the invention. FIG. 34 is a first rotation speed diagram during driving in reverse in the third embodiment of the invention. FIG. 35 is a second torque diagram during driving in reverse in the third embodiment of the invention. FIG. 36 is a second rotation speed diagram during driving in reverse in the third embodiment of the invention. In FIGS. 27 and 28, a horizontal axis shows the target output torque TO*, and a vertical axis shows the one-way clutch torque TOWC.

In this case, a one-way clutch F1 is disposed between the output shaft 12 as the output member of the engine 11 and a casing 80 as the fixing member. The output shaft 12 is divided into a portion 12a closer to the engine (E/G) 11 and a portion 12b closer to the planetary gear unit 13 as the differential gear unit. Upon receipt of the external force, the one-way clutch F1 prevents the engine 11 from rotating in the reverse direction and allows its rotation in the forward direction.

The engine operating necessity judging means MS2 (not shown) of the vehicle control apparatus 61 (FIG. 3) judges whether it is necessary to operate the engine, and judges whether the engine 11 should be operated. When the engine 11 is to be operated, the vehicle control apparatus 61 performs the engine control to operate the engine 11, and the first motor control to drive the first and the second electric motors 16, 25. When the engine 11 is not to be operated, the electric motor control means MS3 (not shown) of the vehicle control apparatus 61 performs the second motor control to drive the first and second electric motors 16, 25.

At that time, the engine non-rotational state forming means 94 (FIG. 1) and the applying torque setting means (not shown) of the electric motor control means MS3 refer to the forward one-way clutch torque map in FIG. 27 during forward running of the hybrid vehicle, and refers to the reverse one-way clutch torque map in FIG. 28 during reverse running of the hybrid vehicle. As a result, the one-way clutch torque TOWC is calculated. The engine non-rotational state forming means 94 and the applying torque setting means generate a predetermined engine torque TE as the torque acting on the one-way clutch F1, i.e., as the one-way clutch torque TOWC corresponding to the target output torque TO*. In this case, the one-way clutch torque TOWC is always generated in the direction to lock the one-way clutch F1 to energize the portion 12b of the output shaft 12 closer to the planetary gear unit 13 in the reverse rotation direction. Therefore the one-way clutch F1 can be held in its locked state.

The control torque calculating means 92 of the electric motor control means MS3 calculates the target electric motor torque TM1*, TM2* as the target control torque for electrically controlling torque of the first and second electric motors 16, 25 based on the following equations (9) and (10) so as to generate the target output torque TO*:

$$TM1^* = -((B+C)/((A+B+C)GO \cdot GM1))TO^* - \quad (9)$$
$$(C/((A+B+C)GM1))TOWC$$
$$= K1 \cdot TO^* + K5 \cdot TOWC$$

$$TM2^* = -(A/((A+B+C)GO))TO^* - \quad (10)$$
$$((A+B)/(A+B+C))TOWC$$
$$= K2 \cdot TO^* + K6 \cdot TOWC$$

The target motor torque TM1* is sent to the first motor control apparatus 47, and the target motor torque TM2* is sent to the second motor control apparatus 49. Constants K1, K2, K5 and K6 are expressed as follows:

$K1=-((B+C)/((A+B+C)GO \cdot GM1))$ $K2=-(A/((A+B+C)GO))$ $K5=-(C/((A+B+C)GM1))$ $K6=-((A+B)/(A+B+C))$ Polarities of the electric motor torque TM1, TM2 are positive when they are generated in the same direction as that of the engine torque TE when the engine 11 is driven. When the vehicle is driven by the first and second electric motors 16, 25, the polarity of the output torque TO becomes negative. Therefore, when the target output torque TO* is substituted into the equations (7) and (8), it is necessary to reverse the polarity of the target output torque TO*.

When the hybrid vehicle is allowed to move forward in the vehicle driving state, the first and second electric motors 16, 25 are controlled such that the one-way clutch torque TOWC is generated and the output torque TO becomes the target output torque TO*. As a result, the first torque diagram shown in FIG. 29 and the first rotation speed diagram shown in FIG. 30 can be obtained. In this case, the first and second electric motors 16, 25 are brought into the motor driving states. When the hybrid vehicle is allowed to move forward in the vehicle non-driving state, the first and second electric motors 16, 25 are controlled such that the one-way clutch torque TOWC is generated and the output torque TO becomes the target output torque TO*. The second torque diagram shown in FIG. 31 and the second rotation speed diagram shown in FIG. 32, thus, can be obtained. In this case, the first electric motor 16 is brought into the motor non-driving state, and the second electric motor 25 is brought into the motor driving state.

When the hybrid vehicle is allowed to move backward, i.e., in reverse, in the vehicle driving state, the first and second electric motors 16, 25 are controlled such that the one-way clutch torque TOWC is generated and the output torque TO becomes the target output torque TO*. The first torque diagram shown in FIG. 33 and the first rotation speed diagram shown in FIG. 34, thus, can be obtained. In this case, the first electric motor 16 is brought into the motor driving state, and the second electric motor 25 is brought into the motor non-driving state.

When the hybrid vehicle is allowed to move backward, i.e., in reverse, in the vehicle non-driving state, the first and second electric motors 16, 25 are controlled such that the one-way clutch torque TOWC is generated and the output torque TO becomes the target output torque TO*. The second torque diagram shown in FIG. 35 and the second rotation speed diagram shown in FIG. 36, thus, can be obtained. In this case, the first and the second electric motors 16, 25 are brought into the motor non-driving state.

In this case, the output shaft 12 is fixed by the one-way clutch F1, and the engine 11 is held in the non-rotational state. Therefore, the one-way clutch torque TOWC acts on the planetary gear unit 13 as a reaction force. Thus, in the torque diagram, the one-way clutch torque TOWC is generated in the same direction as the engine torque TE when the engine 11 is operated, and the polarity of the one-way clutch torque TOWC is positive. As shown in FIGS. 29 to 36, the motor operating state and the motor non-driving state of the first and the second electric motors 16, 25 may vary depending on the change in the magnitude of the output torque TO and the one-way clutch torque TOWC, respectively.

In the state where the hybrid vehicle moves forward, if the one-way clutch F1 is held in its locked state, the output torque TO can be increased as compared with the case provided with no one-way clutch F1. In this case, in order to increase the output torque TO, it is necessary to increase the one-way clutch torque TOWC corresponding to the output torque TO. Therefore, in FIG. 27, the one-way clutch torque TOWC is so set that the greater the target output torque TO* becomes to exceed a predetermined value, the greater the one-way clutch torque TOWC becomes.

On the other hand, when the hybrid vehicle moves backward, i.e., in reverse if the one-way clutch F1 is held in its unlocked state (when the one-way clutch torque TOWC is held at zero), the output torque TO can be increased as compared with the case where the one-way clutch F1 is held locked. Therefore, in FIG. 28, the one-way clutch torque TOWC is so set that the greater the target output torque TO* becomes to exceed a predetermined value in the reverse direction, i.e., the negative direction, the smaller the value of the one-way clutch torque TOWC becomes. When the target output torque TO* is greater than another predetermined value in the negative direction, the one-way clutch torque TOWC is set at zero.

In the torque diagram, at the hybrid vehicle forward moving state, the one-way clutch torque TOWC and the output torque TO are generated in the opposite directions as shown in FIG. 29. Upon the increase in the output torque TO, the one-way clutch torque TOWC acting on the planetary gear unit 13 may increase as a reaction force. Therefore, the output torque TO can be increased while keeping the one-way clutch F1 in its locked state.

Meanwhile, at the hybrid vehicle reverse moving state, the one-way clutch torque TOWC and the output torque TO are generated in the same direction as shown in FIG. 33. Therefore, increase in the electric motor torque TM1, TM2 corresponding to the output torque TO is limited. Thus, the one-way clutch torque TOWC acting on the planetary gear unit 13 as the reaction force is decreased. Therefore, it is not possible to hold the one-way clutch F1 in its locked state and thus, the output torque TO can not be increased.

The one-way clutch torque TOWC is generated in this manner, and the portion 12b of the output shaft 12 closer to the planetary gear unit 13 is energized in the forward rotation direction. The one-way clutch F1 is always held in its locked state. If an error occurs in the control of the electric motor torque TM1, TM2 to generate the torque for rotating the engine 11 in the forward or reverse direction, the engine 11 may rotate in the forward direction but may not rotate in the reverse direction. Thus, the function of the engine 11 is not affected.

Next, a flowchart shown in FIG. 26 will be explained.

In step S11, it is judged whether the forward range (position) is selected. If the forward range (position) is selected, the process proceeds to step S13. If the forward range (position) is not selected, the process proceeds to step S12.

In step S12, it is judged whether the reverse range (position) is selected. If the reverse range (position) is selected, the process proceeds to step S14. If the reverse range (position) is not selected, then the process is completed.

In step S13, a forward torque map is referred to, and the target output torque TO* is set.

In step S14, a reverse torque map is referred to, and the target output torque TO* is set.

In step S15, it is judged whether the engine 11 should be operated. If the engine 11 is operated, the process proceeds to step S16, and if the engine 11 is not operated, the process then proceeds to step S18.

In step S16, the engine control is performed.

In step S17, the first motor control is performed, and then the process is completed.

In step S18, the one-way clutch torque TOWC is calculated.

In step S19, the second motor control is performed, and then the process is completed.

Next, a fourth embodiment of the invention will be described. Portions having the same constructions as those of the first embodiment are represented by the same reference numerals in the drawing concerned, and the description thereof will be omitted.

Figure 37:
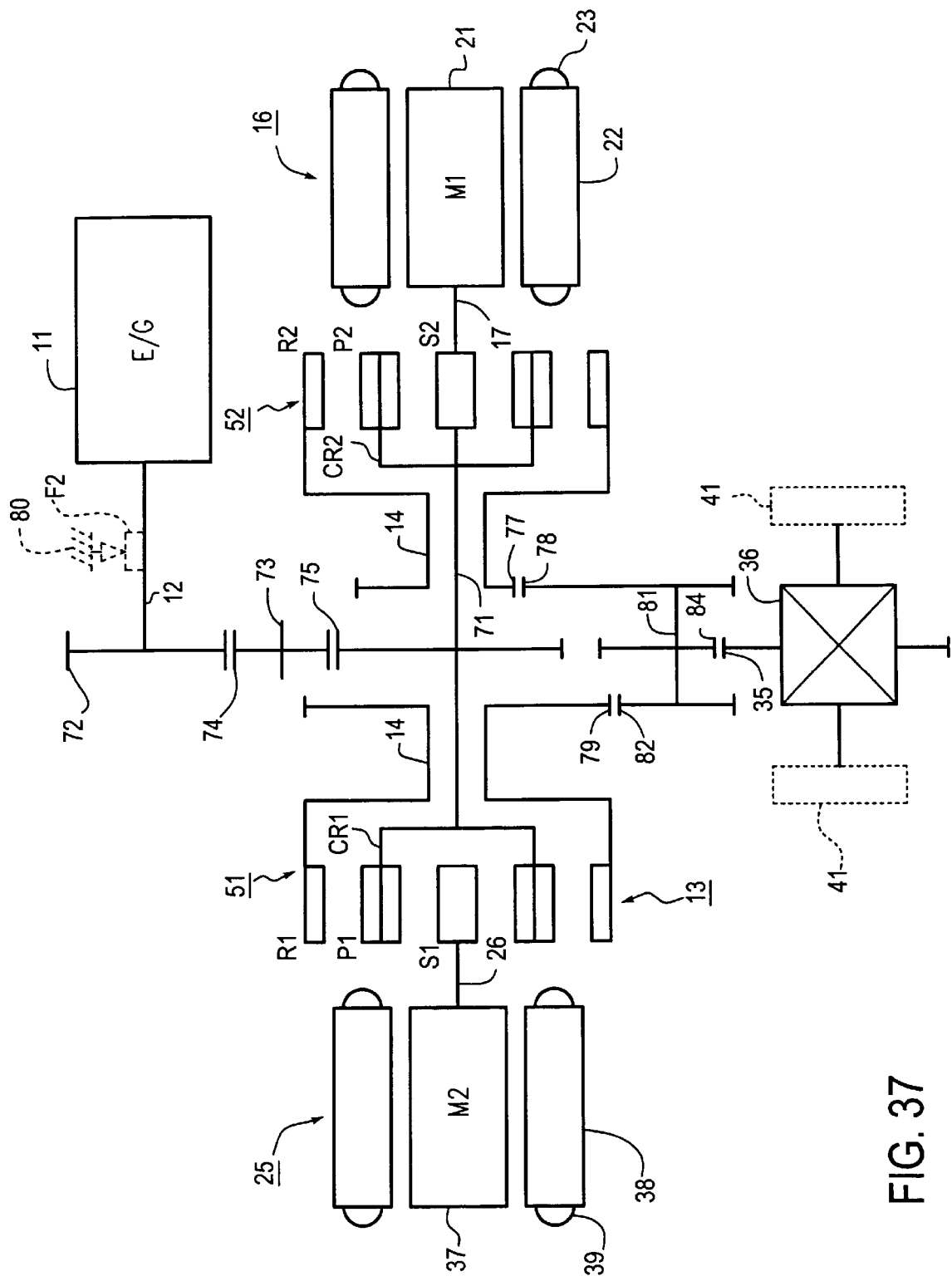
FIG. 37 is a key map of a hybrid vehicle of a fourth embodiment of the invention.

FIG. 37 is a conceptual diagram of a hybrid vehicle according to the fourth embodiment of the invention.

In this case, in a planetary gear unit 13 as a differential gear device, carriers CR1, CR2 are connected via a driven shaft 71. The engine (E/G) 11 and the carriers CR1, CR2 as a first gear element are connected. A first electric motor (M1) 16 and a sun gear S2 as a second gear element are connected. A second electric motor (M2) 25 and a sun gear S1 as a third gear element are connected. An output shaft 14 and ring gears R1, R2 as fourth gear elements are connected.

For the connections, the engine 11, the first electric motor 16 and the second electric motor 25 are provided with an output shaft 12, an output shaft 17 and a transmission shaft 26, respectively. The output shaft 12 and the carriers CR1, CR2 are connected via a drive gear 72 attached to the output shaft 12, a counter gear 74 that is disposed rotatably with respect to a counter shaft 73 and that is meshed with the drive gear 72, and a driven gear 75 meshed with the counter gear 74. The output shaft 17 and the sun gear S2 are connected. The transmission shaft 26 and the sun gear S1 are connected.

In order to rotate drive wheels 41 in the same direction as revolution of the engine 11, counter drive gears 77, 79 are attached to the output shaft 14. A counter shaft 81 is disposed, to which counter driven gears 78, 82 and a pinion drive gear 84 are fixed. The counter drive gears 77, 79 are meshed with the counter driven gears 78, 82, respectively.

A large ring gear 35 is fixed to a differential device 36. The pinion drive gear 84 and the large ring gear 35 are meshed.

A one-way clutch F2 may be disposed on the output shaft 12 if necessary. When the one-way clutch F2 is not disposed, the engine torque TE is set at zero and the target electric motor torque TM1*, TM2* as the control torque are set in the state where the engine 11 is stopped as in the first embodiment. Alternatively the engine torque TE is generated in the state where the engine 11 is stopped and the target electric motor torque TM1*, TM2* are set as in the second embodiment.

When the one-way clutch F2 is disposed, the one-way clutch torque TOWC is generated in the state where the engine 11 is stopped and the target electric motor torque TM1*, TM2* are set as in the third embodiment.

Next, a fifth embodiment of the invention will be described. Portions having the same constructions as those of the first embodiment are represented by the same reference numerals in the drawing concerned, and the description thereof will be omitted.

Figure 38:
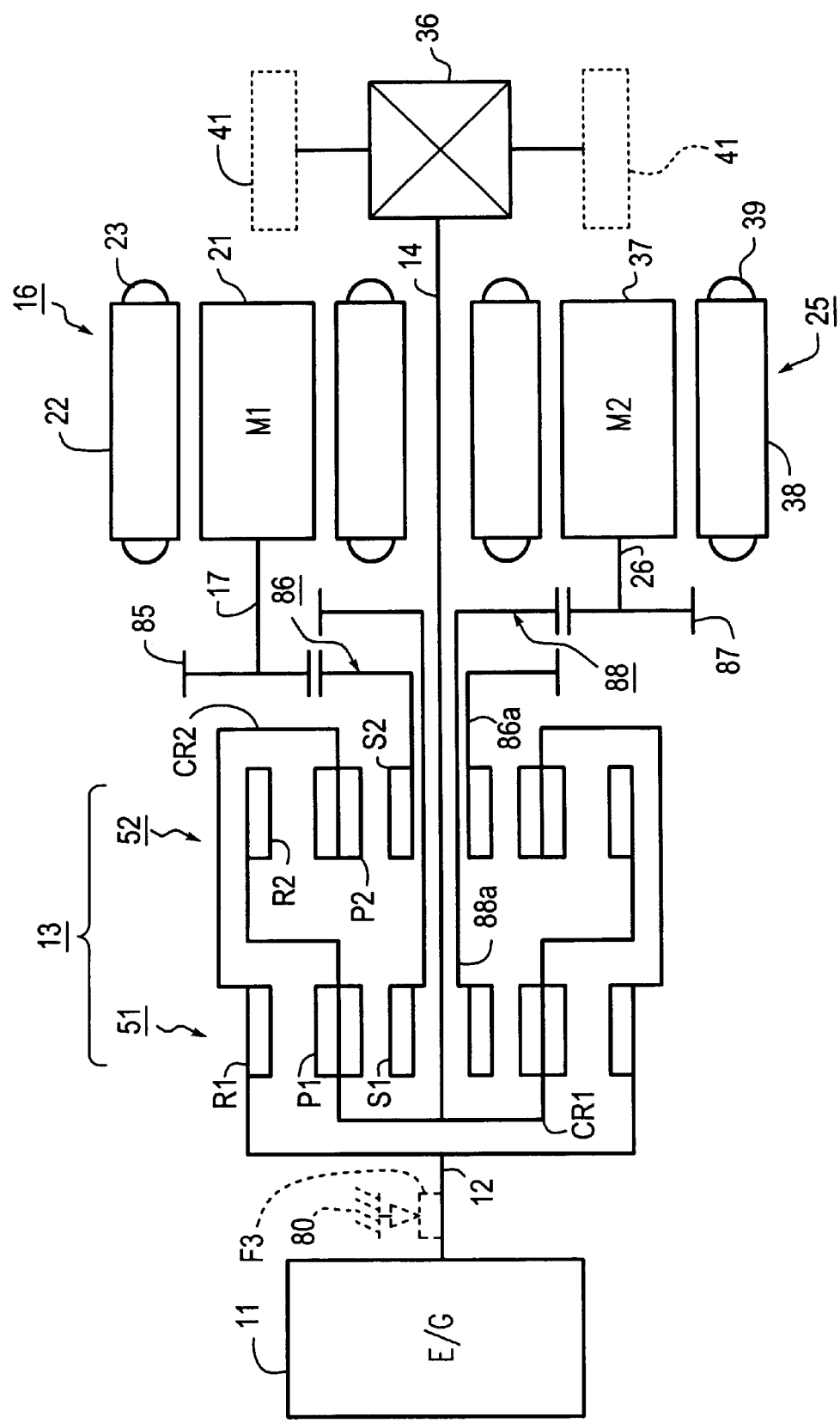
FIG. 38 is a key map of a hybrid vehicle of a fifth embodiment of the invention.

FIG. 38 is a conceptual diagram of a hybrid vehicle in accordance with the third embodiment of the invention.

In this case, in a planetary gear unit 13 as a differential gear device, a carrier CR1 and a ring gear R2 are connected, and a ring gear R1 and a carrier CR2 are connected. The engine (E/G) 11, and the ring gear R1 and the carrier CR2 as first gear elements are connected. A first electric motor (M1) 16 and a sun gear S2 as a second gear element are connected. A second electric motor (M2) 25 and a sun gear S1 as a third gear element are connected. An output shaft 14, and the carrier CR1 and the ring gear R2 as fourth gear elements are connected.

For the connections, the engine 11, the first electric motor 16 and the second electric motor 25 are provided with an output shaft 12, an output shaft 17 and a transmission shaft 26, respectively. The output shaft 12 and the ring gear R1 are connected. The output shaft 17 and the sun gear S2 are connected via a drive gear 85 attached to the output shaft 17, and a driven gear 86 attached to the sun gear S2. The transmission shaft 26 and the sun gear S1 are connected via a drive gear 87 attached to the transmission shaft 26, and a driven gear 88 attached to the sun gear S1.

The driven gears 86, 88 have sleeve portions 86a, 88a, respectively. The output shaft 14 is surrounded by the sleeve portion 88a. The sleeve portion 88a is surrounded by the sleeve portion 86a.

A one-way clutch F3 may be disposed on the output shaft 12 if necessary. When the one-way clutch F3 is not disposed, the engine torque TE is set at zero and the target electric motor torque TM1*, TM2* as control torque are set in a state where the engine 11 is stopped as in the first embodiment. Alternatively the engine torque TE is generated in the state where the engine 11 is stopped and the target electric motor torque TM1*, TM2* are set as in the second embodiment.

When the one-way clutch F3 is disposed, the one-way clutch torque TOWC is generated in the state where the engine 11 is stopped and the target electric motor torque TM1*, TM2* are set as in the third embodiment.

The fourth and fifth embodiments differ from the first embodiment in the construction of the planetary gear unit 13, and the connection relationships of the engine 11, the first and second electric motors 16, 25, and the output shaft 14 with respect to the planetary gear unit 13. Therefore, the control method in the first to the third embodiments can be adapted to the fourth and fifth embodiments in the following manner. That is, the constants K1 to K6 for calculating the target motor torque Tm1*, TM2* are changed and the positive/negative signs thereof are reversed.

The invention is not limited to the foregoing embodiments, but may be modified in various manners based on the gist of the invention. Such modifications are not excluded from the scope of the invention.

What is claimed is:

1. A control apparatus of a hybrid vehicle comprising: first and second motors; an output shaft connected to a driving wheel; a differential gear unit including at least four gear elements, which are respectively connected to the engine, the first and second motors and the output shaft; a one-way clutch disposed between an output member and a fixing member of the engine for preventing the engine from rotating in a reverse direction and for allowing the engine to rotate in the forward direction; target output torque setting means for setting a target output torque corresponding to the output torque output to the output shaft; control torque calculating means for calculating a control torque as a target for electrically controlling the first and second motors based on the target output torque; and torque control means for controlling torque of the first and second motors in accordance with the control torque, wherein control torque calculating means is provided with engine non-rotational state forming means for bringing the engine into a non-rotational state while keeping the engine stopped, which generates a predetermined one-way clutch torque caused to act on the one-way clutch.

2. The control apparatus of a hybrid vehicle according to claim 1, wherein the one-way clutch torque is generated in a direction where the one-way clutch is locked.

3. The control apparatus of a hybrid vehicle according to claim 1, wherein the control torque is represented by target motor torque TM1*, TM2*, and when it is assumed that the target output torque is TO* and the one-way clutch torque is TOWC, the target motor torque TM1*, TM2* are expressed by the following equations:

$$TM1^* = K1 \cdot TO^* + K5 \cdot TOWC, \text{ and } TM2^* = K2 \cdot TO^* + K6 \cdot TOWC,$$

where K1, K2, K5, K6 are constants.

4. The control apparatus of a hybrid vehicle comprising: first and second motors; an output shaft connected to a driving wheel; a differential gear unit including at least four gear elements, which are respectively connected to an engine, the first and second motors and the output shaft; a one-way clutch disposed between an output member and a fixing member of the engine for preventing the engine from rotating in a reverse direction and for allowing the engine to rotate in a forward direction; target output torque setting means for setting a target output torque corresponding to the output torque output to the output shaft; applying torque setting means for setting a predetermined one-way clutch torque to act on the one-way clutch; and control torque calculating means for calculating a control torque as a target for electrically controlling the first and second motors based on the target output torque and the torque caused to act on the one-way clutch torque; and torque control means for controlling torque of the first and second motors in accordance with the control torque.

5. The control apparatus of a hybrid vehicle according to claim 4, wherein the one-way clutch torque is generated in a direction where the one-way clutch is locked.

6. The control apparatus of a hybrid vehicle according to claim 4, wherein the control torque is represented by target motor torque TM1*, TM2*, and when it is assumed that the target output torque is TO* and the one-way clutch torque is TOWC, the target motor torque TM1*, TM2* are expressed by the following equations:

$$TM1^* = K1 \cdot TO^* + K5 \cdot TOWC, \text{ and } TM2^* = K2 \cdot TO^* + K6 \cdot TOWC,$$

where K1, K2, K5, K6 are constants.

7. The control apparatus of a hybrid vehicle according to claim 4, wherein the one-way clutch torque is set corresponding to the target output torque.

8. The control apparatus of a hybrid vehicle according to claim 7, wherein the one-way clutch torque is increased as the target output torque becomes greater during driving forward.

9. The control apparatus of a hybrid vehicle according to claim 7, wherein the one-way clutch torque is set at zero when the target output torque becomes greater than a predetermined value in a reverse direction during driving in reverse.

* * * * *

UNITED STATES PATENT AND TRADEMARK OFFICE
CERTIFICATE OF CORRECTION

PATENT NO.     : 6,654,672 B2
DATED          : November 25, 2003
INVENTOR(S)    : Kozo Yamaguchi et al.

It is certified that error appears in the above-identified patent and that said Letters Patent is hereby corrected as shown below:

<u>Title page,</u>
Item [56], References Cited, FOREIGN PATENT DOCUMENTS, insert
-- DE 199 25 229 A     01/2000          Germany --

Signed and Sealed this

Fourteenth Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,654,672 B2
DATED : November 25, 2003
INVENTOR(S) : Kozo Yamaguchi et al.

It is certified that error appears in the above-identified patent and that said Letters Patent is hereby corrected as shown below:

<u>Title page,</u>
Item [56], References Cited, should read:
-- U.S. PATENT DOCUMENTS

| | | | |
|---|---|---|---|
| 5,558,589 A | * 9/1996 | Schmidt | 475/5 |
| 5,635,805 A | * 6/1997 | Ibaraki et al. | 318/139 |
| 5,788,006 A | 8/1998 | Yamaguchi | |
| 5,899,286 A | * 5/1999 | Yamaguchi | 180/65.3 |
| 5,931,757 A | * 8/1999 | Schmidt | 475/2 |
| 6,087,734 A | * 7/2000 | Maeda et al. | 290/40 C |
| 6,247,437 B1 | * 6/2001 | Yamaguchi et al. | 123/179.3 |
| 6,253,127 B1 | * 3/2002 | Itoyama et al. | 701/22 |

FOREIGN PATENT DOCUMENTS

| | | |
|---|---|---|
| JP A 8-295140 | 11/1996 | Japan |
| EP 1 149 725 A | 10/2001 | Europe |
| EP 0 937 600 A | 08/1999 | Europe |
| FR 2774 040 A | 07/1999 | France |
| DE 199 25 229 A | 01/2000 | Germany |
| JP A 8-295140 | 11/1996 | Japan |
| EP 1 149 725 A | 10/2001 | Europe |
| EP 0 937 600 A | 08/1999 | Europe |
| FR 2774 040 A | 07/1999 | France --|

Signed and Sealed this

Thirty-first Day of May, 2005

JON W. DUDAS
*Director of the United States Patent and Trademark Office*